United States Patent
Yasui et al.

(10) Patent No.: US 8,024,585 B2
(45) Date of Patent: Sep. 20, 2011

(54) METHOD FOR MANAGING STORAGE, PROGRAM AND SYSTEM FOR THE SAME

(75) Inventors: Takashi Yasui, Kokubunji (JP); Masaaki Shimizu, Mitaka (JP)

(73) Assignee: Hitachi, Ltd., Tokyo (JP)

( * ) Notice: Subject to any disclaimer, the term of this patent is extended or adjusted under 35 U.S.C. 154(b) by 761 days.

(21) Appl. No.: 12/032,219

(22) Filed: Feb. 15, 2008

(65) Prior Publication Data

US 2009/0164822 A1    Jun. 25, 2009

(30) Foreign Application Priority Data

Dec. 25, 2007   (JP) ................. 2007-332043

(51) Int. Cl.
   *G06F 9/30*   (2006.01)
(52) U.S. Cl. ........ 713/300; 713/310; 713/320; 713/321; 713/322; 713/323; 713/330; 713/340; 361/689; 361/716
(58) Field of Classification Search .................. 713/300, 713/310, 320–324, 330, 340; 361/689, 716
   See application file for complete search history.

(56) References Cited

U.S. PATENT DOCUMENTS

| | | | |
|---|---|---|---|
| 5,682,273 A | 10/1997 | Hetzler | |
| 5,954,820 A * | 9/1999 | Hetzler | 713/323 |
| 6,892,313 B1 * | 5/2005 | Codilian et al. | 713/323 |
| 7,231,198 B2 * | 6/2007 | Loughran | 455/343.2 |
| 7,552,347 B2 * | 6/2009 | Schutte | 713/300 |
| 7,573,715 B2 | 8/2009 | Mojaver et al. | |
| 2007/0113005 A1 | 5/2007 | Yamamoto et al. | |
| 2007/0143542 A1 | 6/2007 | Watanabe et al. | |
| 2007/0162692 A1 | 7/2007 | Nishimoto et al. | |

FOREIGN PATENT DOCUMENTS

| | | |
|---|---|---|
| EP | 1770497 A2 | 4/2007 |
| JP | 2007-133821 | 5/2007 |
| JP | 2007-164650 | 6/2007 |
| WO | 03081416 | 10/2003 |
| WO | 2006134039 | 12/2006 |

* cited by examiner

*Primary Examiner* — Abdelmoniem Elamin
(74) *Attorney, Agent, or Firm* — Brundidge & Stanger, P.C.

(57) ABSTRACT

A system including plural storage devices provides a technique for controlling storage devices in which files are located by a file system, and turning on or off the storage devices based on prediction of the start or end of access to the files. A program that manages power to the storage devices and data access to the storage devices via the files includes means or functions for allocating a storage device as an area in which a file is located, for selecting a storage device in which a file is located, for predicting that access to a file is started for commanding turning on power to a storage device based on the prediction that access to a file is started, for predicting that access to a file terminates, and for commanding turning off power to a storage device based on the prediction that access to a file terminates.

18 Claims, 42 Drawing Sheets

FIG.2

USER MANAGEMENT TABLE 101

| USER NAME ⌒200 | PASSWORD ⌒210 | USER IDENTIFIER ⌒220 | GROUP IDENTIFIER ⌒230 | COMMENT ⌒240 | HOME ⌒250 | SHELL ⌒260 |
|---|---|---|---|---|---|---|
| root | xxxxxxxx | 0 | 0 | — | /root | bash |
| usr1 | xxxxxxxx | 1 | 1 | — | /home/usr1 | bash |
| usr2 | xxxxxxxx | 2 | 1 | — | /home/usr2 | tcsh |
| ⋮ | ⋮ | ⋮ | ⋮ | ⋮ | ⋮ | ⋮ |

STORAGE DEVICE MANAGEMENT TABLE 127

| STORAGE DEVICE IDENTIFIER | ALLOCATION USER INFORMATION (USER IDENTIFIER) | POWER COUNTER |
|---|---|---|
| 0 | 0 | 1 |
| 1 | 1 | 1 |
| 2 | 2 | 0 |
| 3 | – | 0 |
| ⋮ | ⋮ | ⋮ |

FIG.17

STORAGE DEVICE MANAGEMENT TABLE 127

| STORAGE DEVICE IDENTIFIER | ALLOCATION USER INFORMATION (USER IDENTIFIER) | POWER COUNTER | SPLIT LOCATION STORAGE DEVICE IDENTIFIER |
|---|---|---|---|
| 0 | 0 | 1 | 1 |
| 1 | 1 | 2 | 2 |
| 2 | 2 | 1 | 3 |
| 3 | — | 0 | 3 |
| ⋮ | ⋮ | ⋮ | ⋮ |

FILE PROPERTY WINDOW 2800

FIG.31

STORAGE DEVICE MANAGEMENT TABLE 127

| STORAGE DEVICE IDENTIFIER (300) | ALLOCATION USER INFORMATION (USER IDENTIFIER) (310) | POWER COUNTER (320) | DATA LOCATION STORAGE DEVICE IDENTIFIER (3100) |
|---|---|---|---|
| 0 | 0 | 1 | 1 |
| 1 | 1 | 2 | 2 |
| 2 | 2 | 0 | 3 |
| 3 | – | 0 | 3 |
| ⋮ | ⋮ | ⋮ | ⋮ |

FILE PROPERTY WINDOW 4100

METHOD FOR MANAGING STORAGE, PROGRAM AND SYSTEM FOR THE SAME

CLAIM OF PRIORITY

The present application claims priority from Japanese applications JP 2007-332043 filed on Dec. 25, 2007, the contents of which are hereby incorporated by reference into this application.

BACKGROUND OF THE INVENTION

The present invention relates to a technique for managing storages by a file system in a computer system, and more particularly to a technique for managing storage power in a large-scale computer system.

With an increase in the amount of data processing in a computer system, storages are becoming large-scale. Some large-scale computer systems have storage devices from several hundred TB to several PB, so that power consumed by the storages is becoming unignorable.

On the other hand, in the above-described large-scale computer systems, access to all storage devices does not occur continuously throughout a year. For example, large-scale computer systems are lent to users on an hour basis, and access to storage devices in which files owned by the users do not exist is rare.

Accordingly, according to a known technique as described in JP-A No. 2007-133821, in a storage in which a physical storage device that can control activation and halt, and a physical storage device that cannot control them coexist, properties are taken into account to set logical storage devices on the physical storage devices and thereby to reduce power consumption of the storage. According to this technique, when access to the logical storage devices set on the physical storage devices is stopped, it is determined whether the physical storage devices can be halted. When they can be halted, they are halted, and otherwise, the logical storage devices are moved to a physical storage device that can be halted, and the physical storage device is halted.

Furthermore, according to a known technique as described in JP-A No. 2007-164650, based on access situation, logical storage devices are moved among physical storage devices having different power supply modes to reduce energization time. With this technique, the relocation of the logical storage devices is scheduled so that logical storage devices frequently accessed are located in physical storage devices of long energization mode, and logical storage devices infrequently accessed are located in physical storage devices of short energization mode. The logical storage devices are relocated based on the frequency of access to the physical storage devices.

BRIEF SUMMARY OF THE INVENTION

By the way, with the above-described conventional techniques, the activation and halt of a storage device is controlled based on access situations. In this case, there is a problem in that, when a file frequently accessed is interspersed on plural storage devices, since the number of storage devices that can be halted becomes smaller, the effect of reducing power consumption could become smaller.

Furthermore, with the above-described conventional techniques, when a file to be accessed is located in a halted storage device, after the storage device is activated by the access, the file is accessed. In this case, there is another problem in that since it takes several tens of seconds to activate the storage device, access to the file could time out.

Accordingly, the present invention has been made in view of the above problems, and its object is to increase the effect of reducing power consumption of storages by controlling storage devices in which files are located by a file system in a computer system that includes plural storage devices.

Another object of the present invention is to prevent access to a file from timing out by turning on or off power to the storage devices, based on the prediction of the start or end of access to the file.

The aforementioned and other objects and novel characteristics of the present invention will become apparent from the description of this specification and the accompanying drawings.

The typical disclosures of the invention will be described in brief as follows.

The present invention is a method for managing power to a storage device in a computer system including at least one storage device, and data access to the storage device via a file, and a program for the same, and has characteristics described below.

The present invention includes: means for allocating a storage device as an area in which a file is located; means for selecting a storage device in which a file is located; means for predicting that access to a file is started; means for commanding turning on power to a storage device, based on the prediction that access to a file is started; means for predicting that access to a file terminates; and means for commanding turning off power to a storage device, based on the prediction that access to a file terminates.

Effects obtained by typical disclosures of the invention will be described in brief as follows.

According to the present invention, the effect of reducing power consumption of storages can be increased by controlling storage devices in which files are located by a file system in a computer system that includes plural storage devices.

Furthermore, according to the present invention, access to a file can be prevented from timing out by turning on or off power to the storage devices, based on the prediction of the start or end of access to the file.

BRIEF DESCRIPTION OF THE DRAWINGS

FIG. 2 is an explanatory drawing showing a user management table in the first embodiment;

FIG. 17 is an explanatory drawing showing a storage device management table in the third embodiment;

FIG. 31 is an explanatory drawing showing a storage device management table in the fourth embodiment;

DETAILED DESCRIPTION OF THE INVENTION

Figure 1:
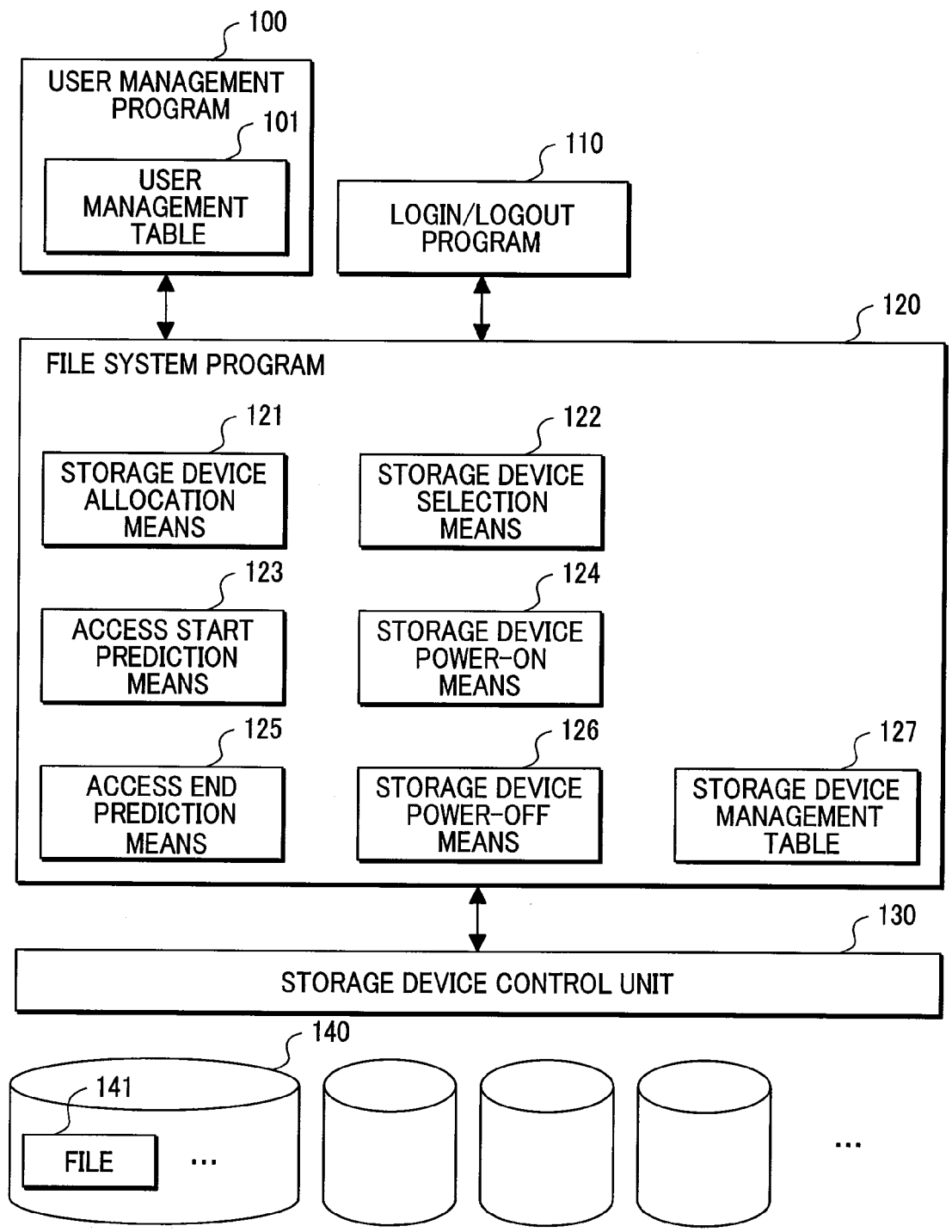
FIG. 1 is a schematic block diagram showing a computer system in a first embodiment.

Hereinafter, embodiments of the present invention will be described with reference to the accompanying drawings. In all drawings for explaining the embodiments, in principle, the same components are identified by the same reference numerals, and repeated descriptions of them are omitted.

First Embodiment

FIG. 1 is a schematic block diagram showing a computer system in a first embodiment of the present invention. A computer system in the first embodiment includes: a user management program 100; a login/logout program 110; a file system program 120; a storage device control unit 130; and plural storage devices 140. The user management program 100, the login/logout program 110, and the file system program 120 are executed in a central processing unit (CPU) constituting a computer of the computer system, and stored in a storage unit (memory). The computer is a general-purpose computer that includes an interface unit through which data is exchanged with a CPU, memory, and external devices (not shown in the drawing) that are connected by an internal bus. Data exchange between the computer and a storage device control unit 130 is performed via the interface unit.

The user management program 100 executed in the CPU registers and deletes users of the computer system, and updates a user management table 101 that holds user IDs and other information. Moreover, the user management program 100, when registering a user of the computer system, passes information of the user to the file system program 120. In this embodiment, a user's identifier will be used as user's information. The user management table 101 is stored in the memory.

The login/logout program 110 accepts login/logout of users registered in the computer system. The login/logout program 110, when accepting user's login/logout to the computer system, consults the user management table 101 to get user's information and pass it to the file system program 120.

The file system program 120 includes plural function configuration means. That is, it includes: storage device allocation means 121; storage device selection means 122; access start prediction means 123; storage device power-on means 124; access end prediction means 125; and storage device power-off means 126. Although these are expressed as "means" for convenience, since they are substantially programs, they are, in some cases, referred to as "function," "feature," or "unit." For example, the access start prediction means 123 may be referred to as an access start prediction function or an access start prediction unit.

The file system program 120 has a storage device management table 127 that holds the identifiers of storage devices 140, users to which storage devices 140 are allocated, and other information, and is stored in the memory.

The storage device control unit 130 accesses a file 141 of a storage device 140 specified based on a request from the file system program 120. Moreover, the storage device control unit 130 controls the power of a storage device 140 specified based on a request from file system program 120.

Some commercially available storage device control units have a function to control power to a storage device. The storage device control unit 130 can use the power control function to control power to the storage devices when the file system program 120 issues a request from the computer to the storage device control unit 130. For example, iStorage StoragePowerConserver (power saving function) in iStorage (registered trademark) series of NEC Corporation can be used.

When the file system program 120 cannot issue a power control request directly from the computer to the storage device control unit 130, by issuing a request to a service processor (hereinafter referred to as SVP) not shown in the drawing, it can issue a power control request to the storage device control unit 130 via the SVP.

The storage device 140 accesses a file 141, based on a request from the storage device control unit 130. Moreover, the storage device 140 turns on or off power, based on the request from the storage device control unit 130.

FIG. 2 is an explanatory drawing showing a user management table in this embodiment.

A column 200 shows user names registered in the computer system. A column 210 shows encrypted passwords. A column 220 shows users' identifiers. A column 230 shows the identifiers of groups to which users belong. A column 240 shows comments on users. A column 250 shows users' home directories. A column 260 shows users' login shells.

Figure 3:
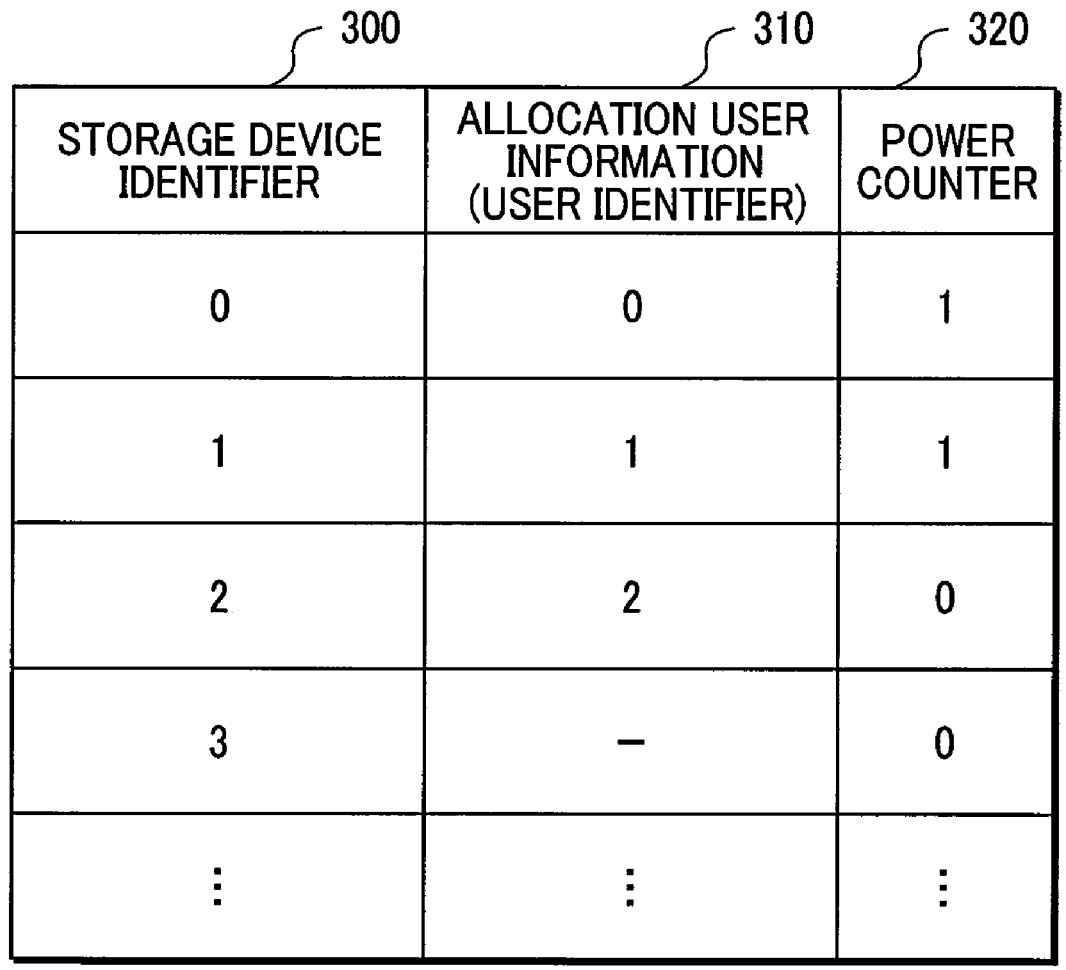
FIG. 3 is an explanatory drawing showing a storage device management table in the first embodiment.

FIG. 3 is an explanatory drawing showing a storage device management table 127.

A column 300 shows the identifiers of storage devices 140. A column 310 shows information of users to which storage devices 140 are allocated. A column 320 shows the power counters of the storage devices 140. As a storage device identifier, for example, LUID (Logical Unit ID) and LVID (Logical Volume ID) are used.

In this embodiment, a storage device 140 allocated to a root user that provides basic commands executed by users is powered when the system is activated, and the power counter of the column 320 is initialized to one so that power to the storage device 140 is not turned off. Moreover, in this embodiment, the value of power counters of the column 320 concerning the storage devices 140 except one allocated to the root user are initialized to zero.

Figure 4:
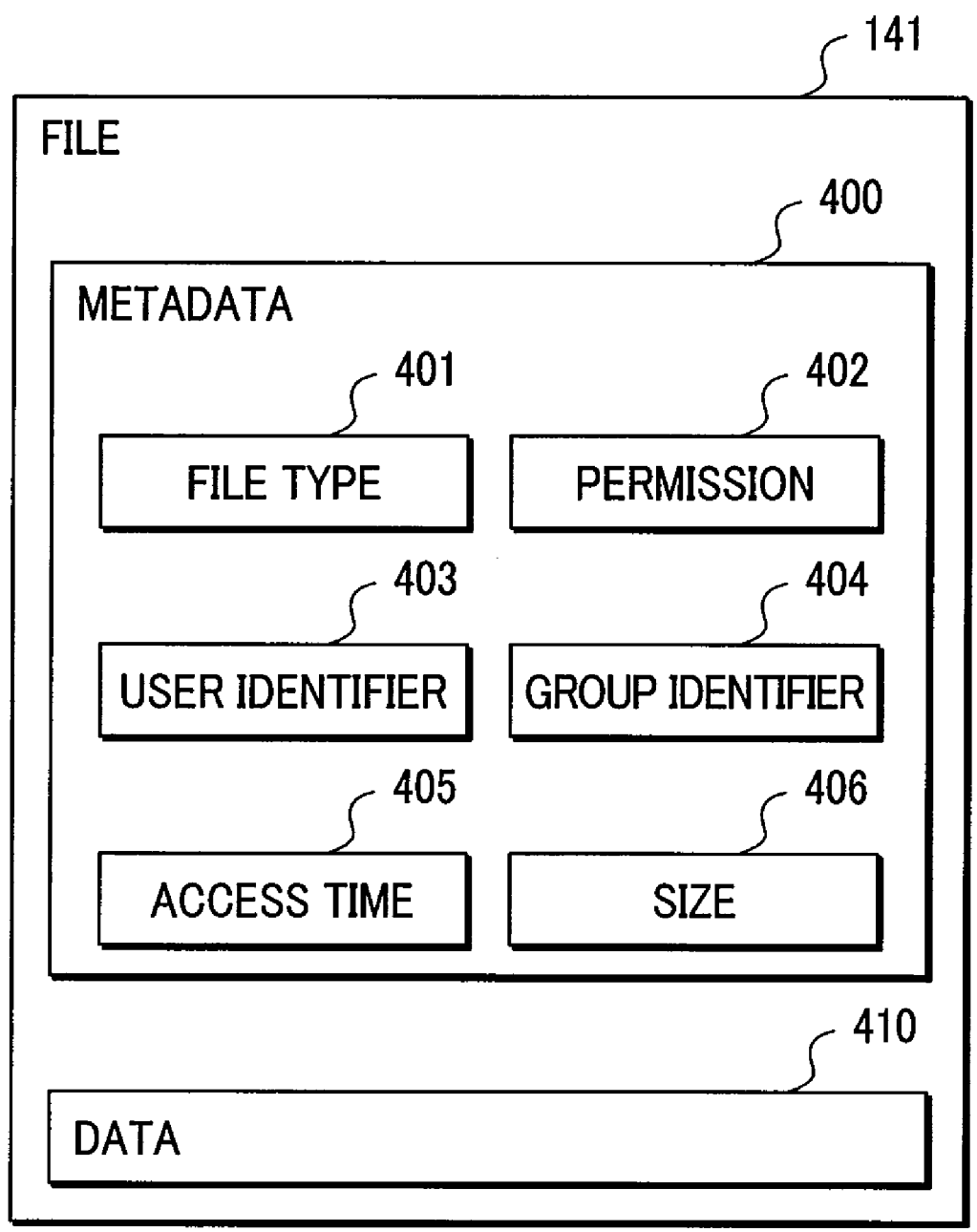
FIG. 4 is an explanatory drawing showing a file of in the first embodiment.

FIG. 4 is an explanatory drawing showing a file within the storage devices 140.

A file 141 includes metadata 400 and data 410. The metadata 400 has information such as file type 401, file permission 402, the identifier 403 of a user owning the file, the identifier 404 of a group to which a user owning the file belongs, file access time 405, and file size 406. The metadata 400, which is sometimes referred to as meta-information, means accessory data of certain data. In this specification, unmodified "data" refers to data except the metadata.

Figure 5:
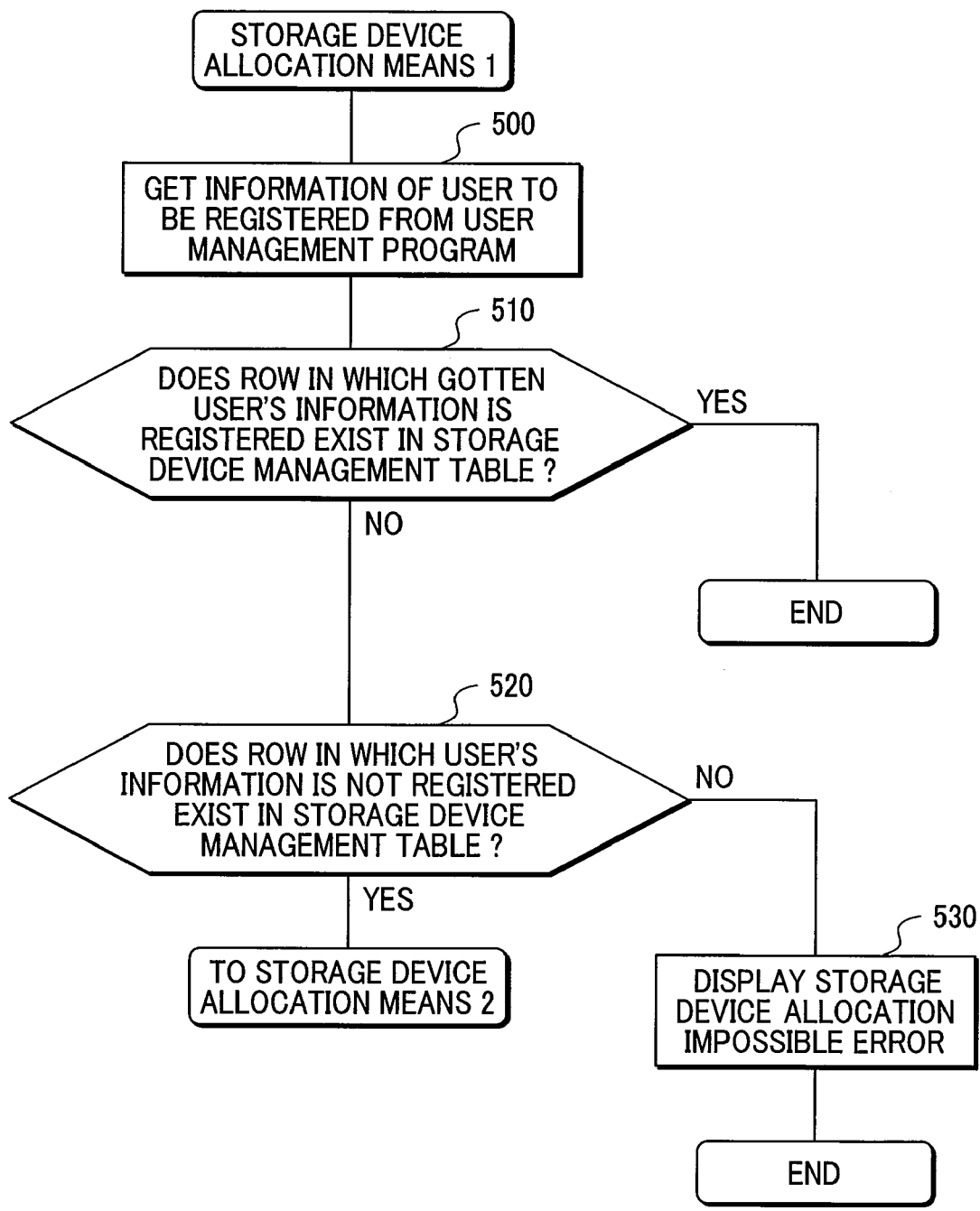
FIG. 5 is a flowchart showing processing of storage device allocation means 1 in the first embodiment.
Figure 6:
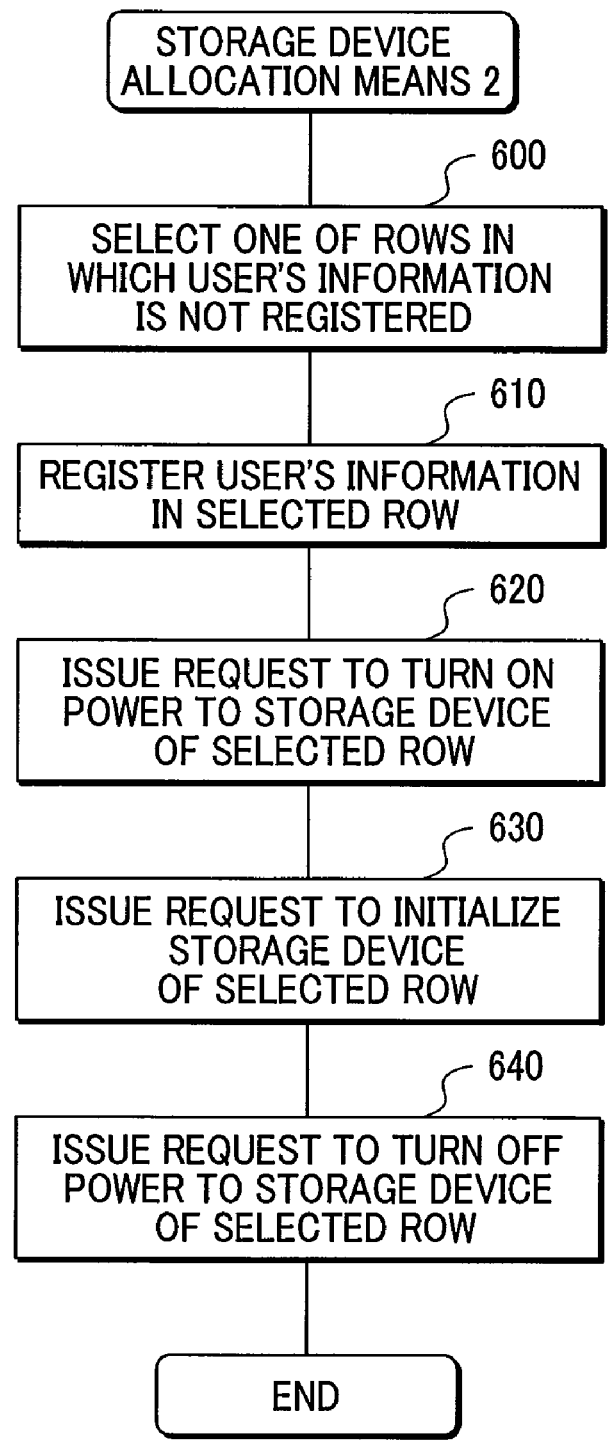
FIG. 6 is a flowchart showing processing of storage device allocation means 2 in the first embodiment.

FIGS. 5 and 6 show a flowchart of processing of the storage device allocation means 121 in this embodiment.

Step 500 of FIG. 5 gets information of a user to be registered to the computer system from the user management program 100.

Step 510 consults the storage device management table 127 to determine whether a row in which the gotten user's information is registered exists in the column 310.

In that case, since no storage device 140 needs to be allocated, the processing terminates. Otherwise, control proceeds to Step 520.

Step 520 consults the storage device management table 127 to determine whether a row in which user's information is not registered exists in the column 310.

Otherwise, control proceeds to Step 530. When a row in which user's information is not registered exists, control proceeds to Step 600 of FIG. 6.

Step 530 displays an error indicating that the storage devices 140 cannot be allocated, and the processing terminates.

Step 600 of FIG. 6 consults the storage device management table 127 to select one of rows in which user's information is not registered that exist in the column 310.

Step 610 registers the user information in the selected row of the column 310.

Step 620 requests the storage device control unit 130 to turn on power to a storage device 140 having an identifier of the column 300 of the selected row.

Step 630 requests the storage device control unit 130 to initialize a storage device 140 having an identifier of the column 300 of the selected row so that a file 141 can be located.

Step 640 requests the storage device control unit 130 to turn off power to a storage device 140 having an identifier of the column 300 of the selected row, and the processing terminates.

Figure 7:
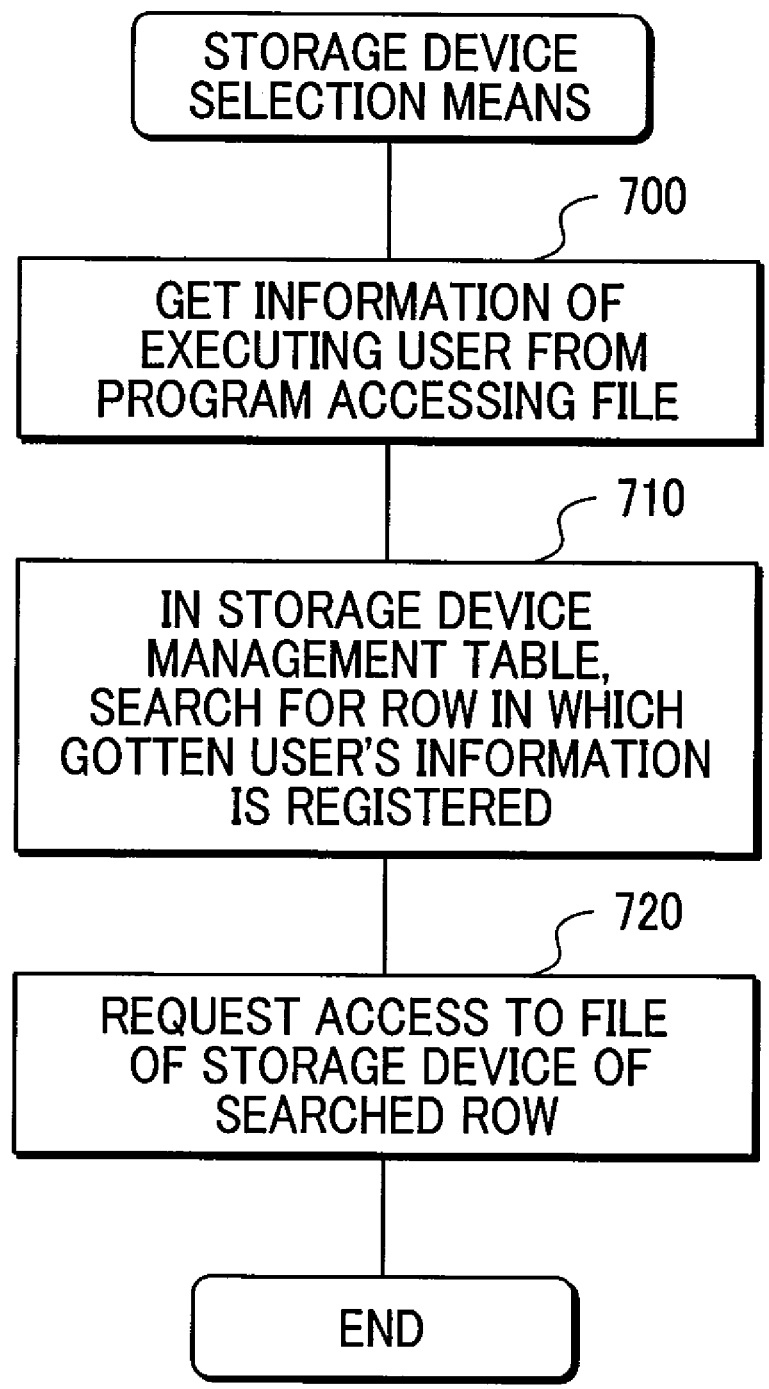
FIG. 7 is a flowchart showing processing of storage device selection means in the first embodiment.

FIG. 7 shows a flowchart of processing of the storage device selection means 122 in this embodiment.

Step 700 gets information of an executing user from a program accessing a file 141.

Step 710 consults the storage device management table 127 to search a row for the column 310 in which the gotten user's information is registered.

Step 720 requests the storage device control unit 130 to access a file 141 of a storage device 140 having an identifier of the column 300 of the searched row.

Figure 8:
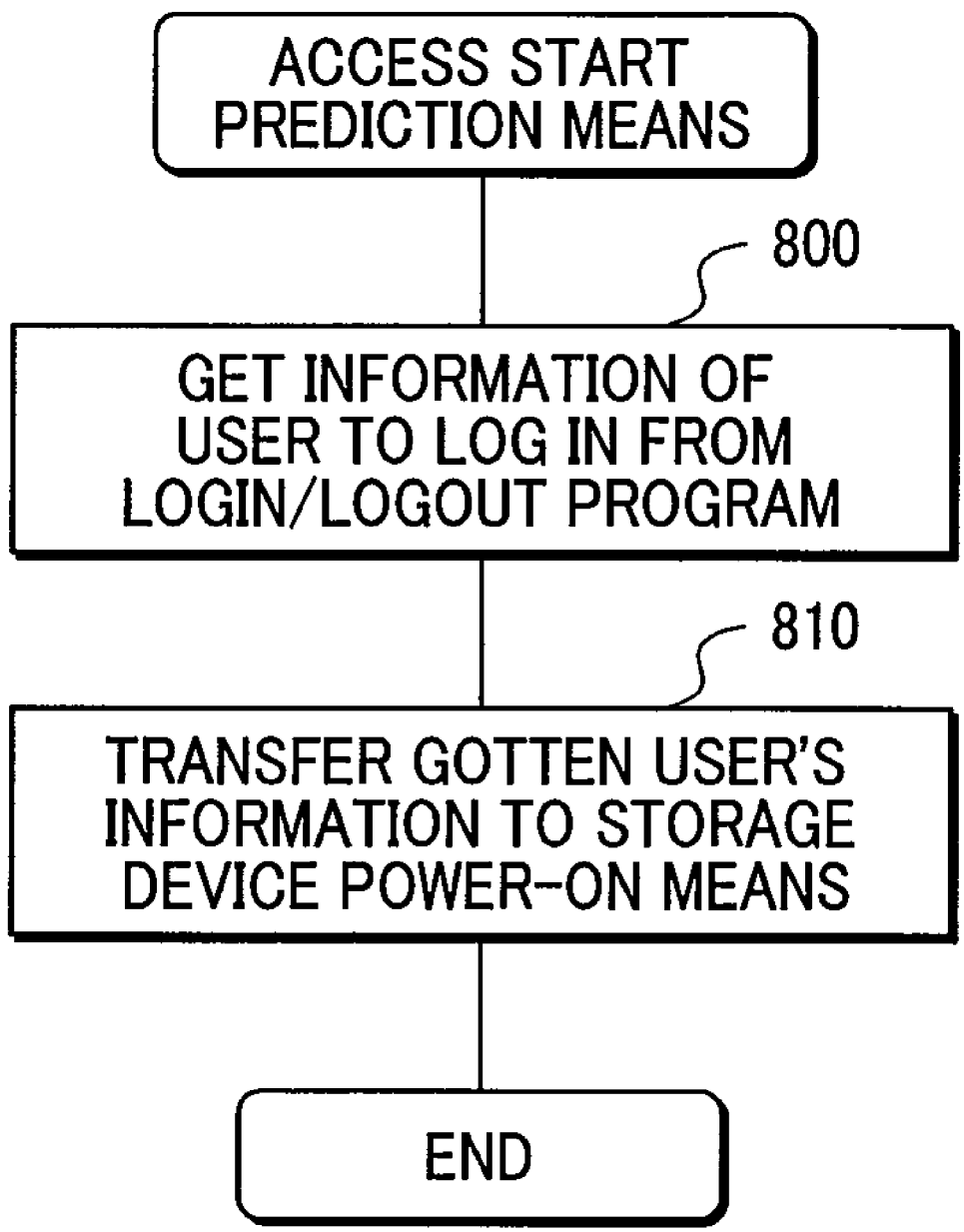
FIG. 8 is a flowchart showing processing of access start prediction means in the first embodiment.

FIG. 8 shows a flowchart of processing of the access start prediction means 123 in this embodiment.

Step 800 gets information of a user to log in the computer system from a login/logout program 110.

Step 810 passes the gotten user's information to the storage device power-on means 124, and the processing terminates.

Figure 9:
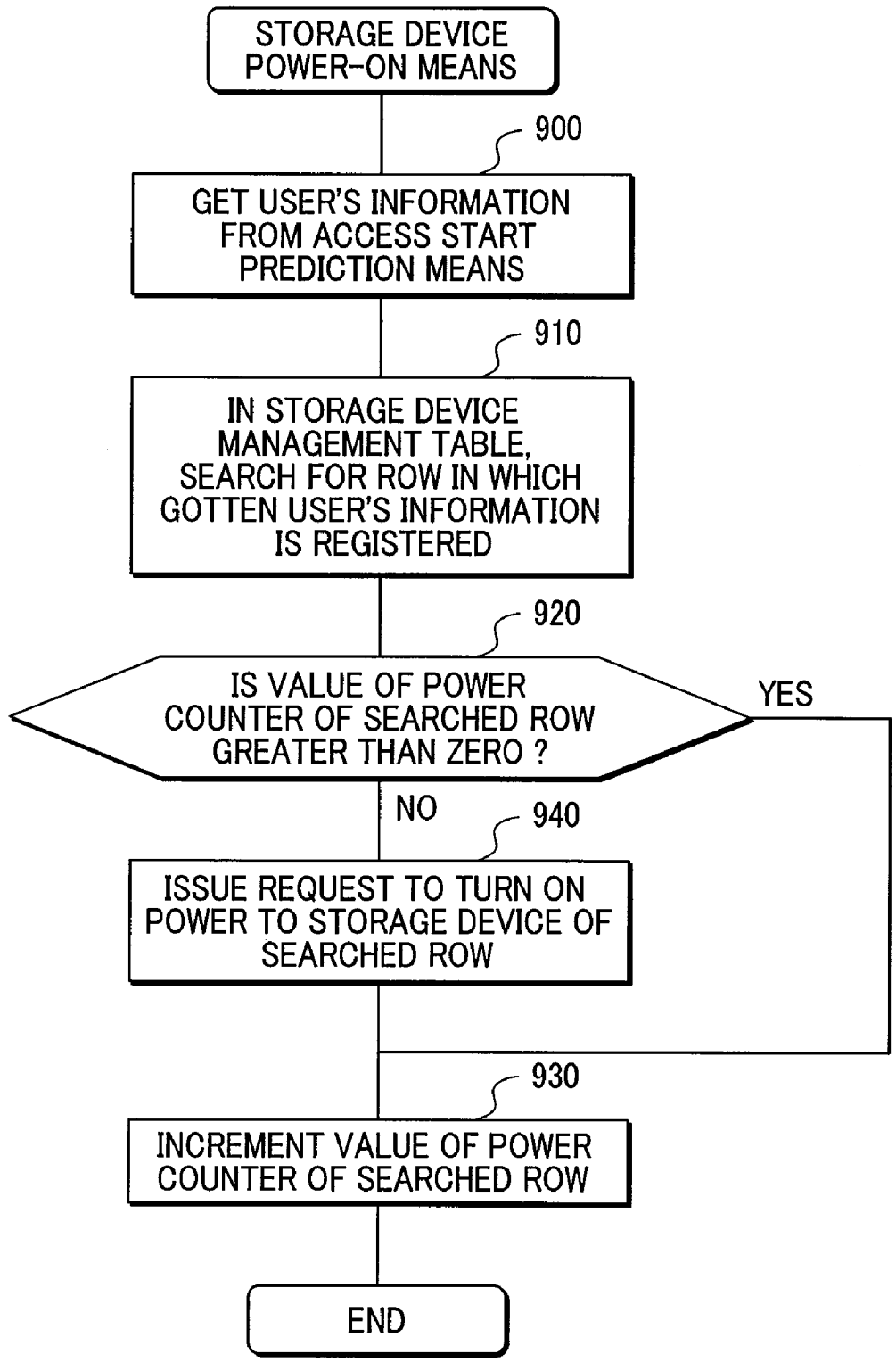
FIG. 9 is a flowchart showing processing of storage device power-on means in the first embodiment.

FIG. 9 shows a flowchart of processing of the storage device power-on means 124 in this embodiment.

Step 900 gets user's information from the access start prediction means 123.

Step 910 consults the storage device management table 127 to search a row for the column 310 in which the gotten user's information is registered.

Step 920 determines the value of the power counter of the column 320 of the searched row.

Step 920, when the value of the column 320 is greater than zero, proceeds to Step 930 because power to the storage device 140 is on. When the value of the column 320 is zero, control proceeds to Step 940.

Step 930 increments the value of the column 320 of the searched row, and the processing terminates.

Step 940 requests the storage device control unit 130 to turn off power to a storage device 140 having an identifier of the column 300 of the searched row.

Figure 10:
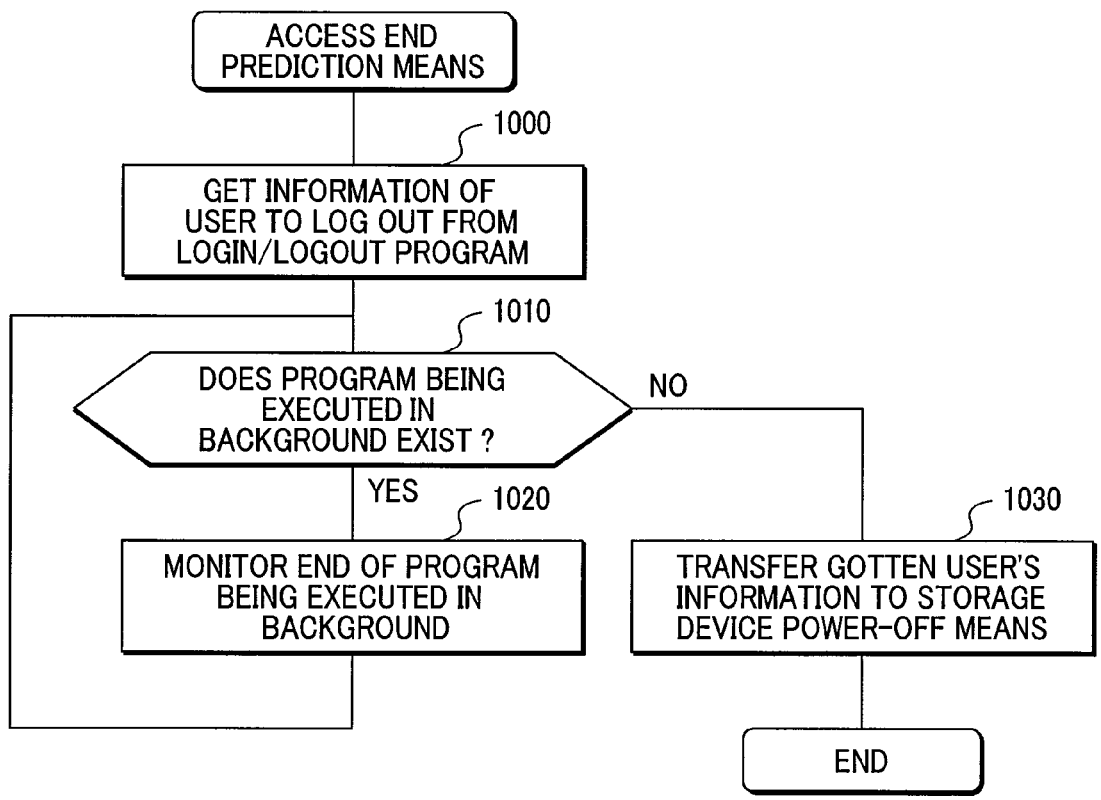
FIG. 10 is a flowchart showing processing of access end prediction means in the first embodiment.

FIG. 10 shows a flowchart of processing of the access end prediction means 125 in this embodiment.

Step 1000 gets information of a user to log out from the computer system from the login/logout program 110.

Step 1010 determines whether a program the user to log out is executing in background exists. A program executed by a user can be confirmed by using an execution program display command, for example.

Step 1010 proceeds to Step 1020 because access to a storage device 140 may occur when a program being executed in background exists. When a program being executed in background does not exist, it proceeds to Step 1030.

Step 1020 monitors the end of a program being executed in background.

Step 1030 passes the gotten user's information to the storage device power-off means 126, and the processing terminates.

Figure 11:
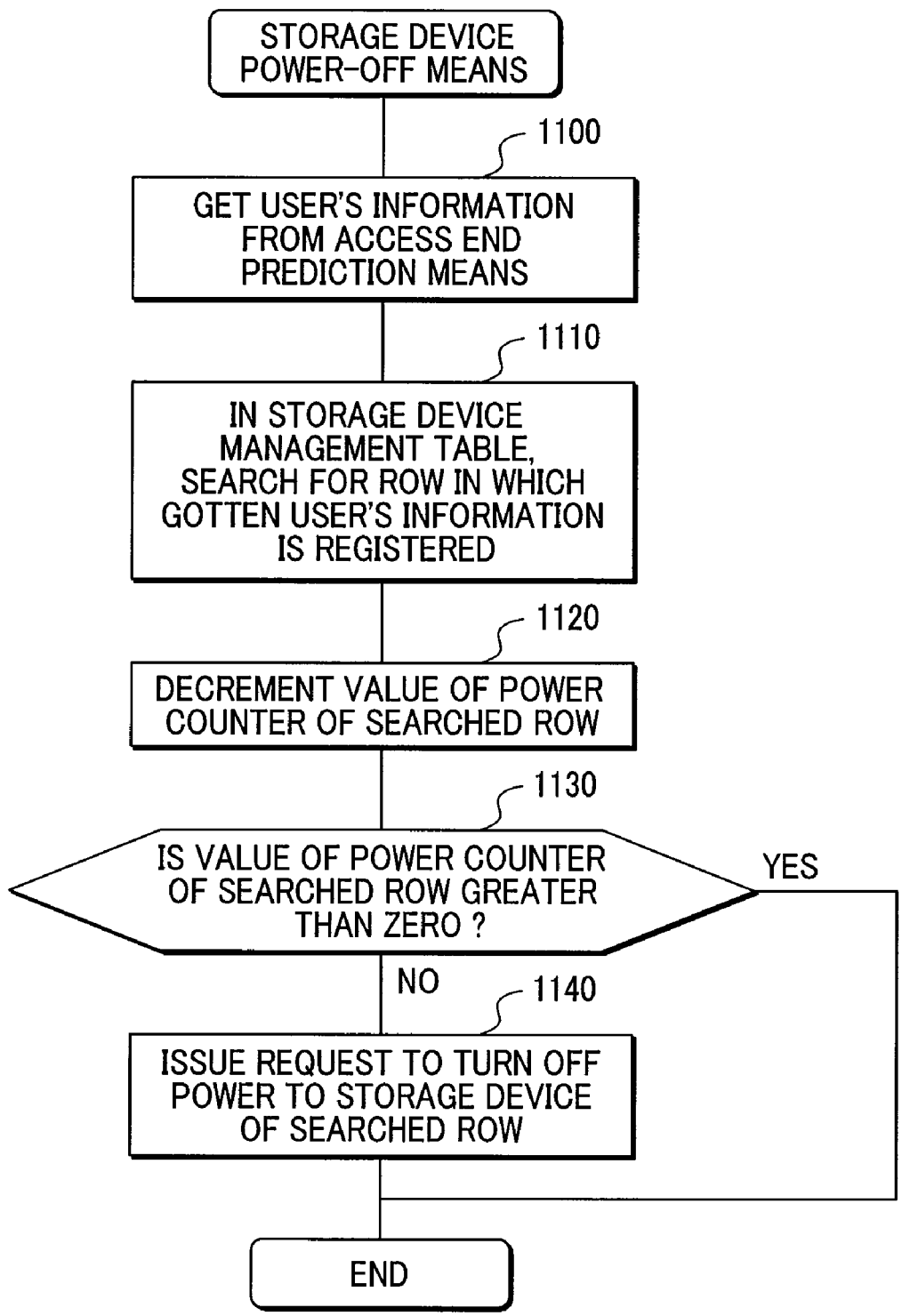
FIG. 11 is a flowchart showing processing of storage device power-off means in the first embodiment.

FIG. 11 shows a flowchart of processing of the storage device power-off means 126 in this embodiment.

Step 1100 gets user's information from the access end prediction means 125.

Step 1110 consults the storage device management table 127 to search a row for the column 310 in which the gotten user's information is registered.

Step 1120 decrements the value of the power counter of the column 320 of the searched row.

Step 1130 determines the value of the power counter of the column 320 of the searched row.

In Step 1130, when the value of the column 320 of the searched line is greater than zero, the processing terminates because power to the storage device 140 does not need to be turned off. When the value of the column 320 of the searched line is zero, control proceeds to Step 1140.

Step 1140 requests the storage device control unit 130 to turn off power to a storage device 140 having an identifier of the column 300 of the searched row.

Figure 12:
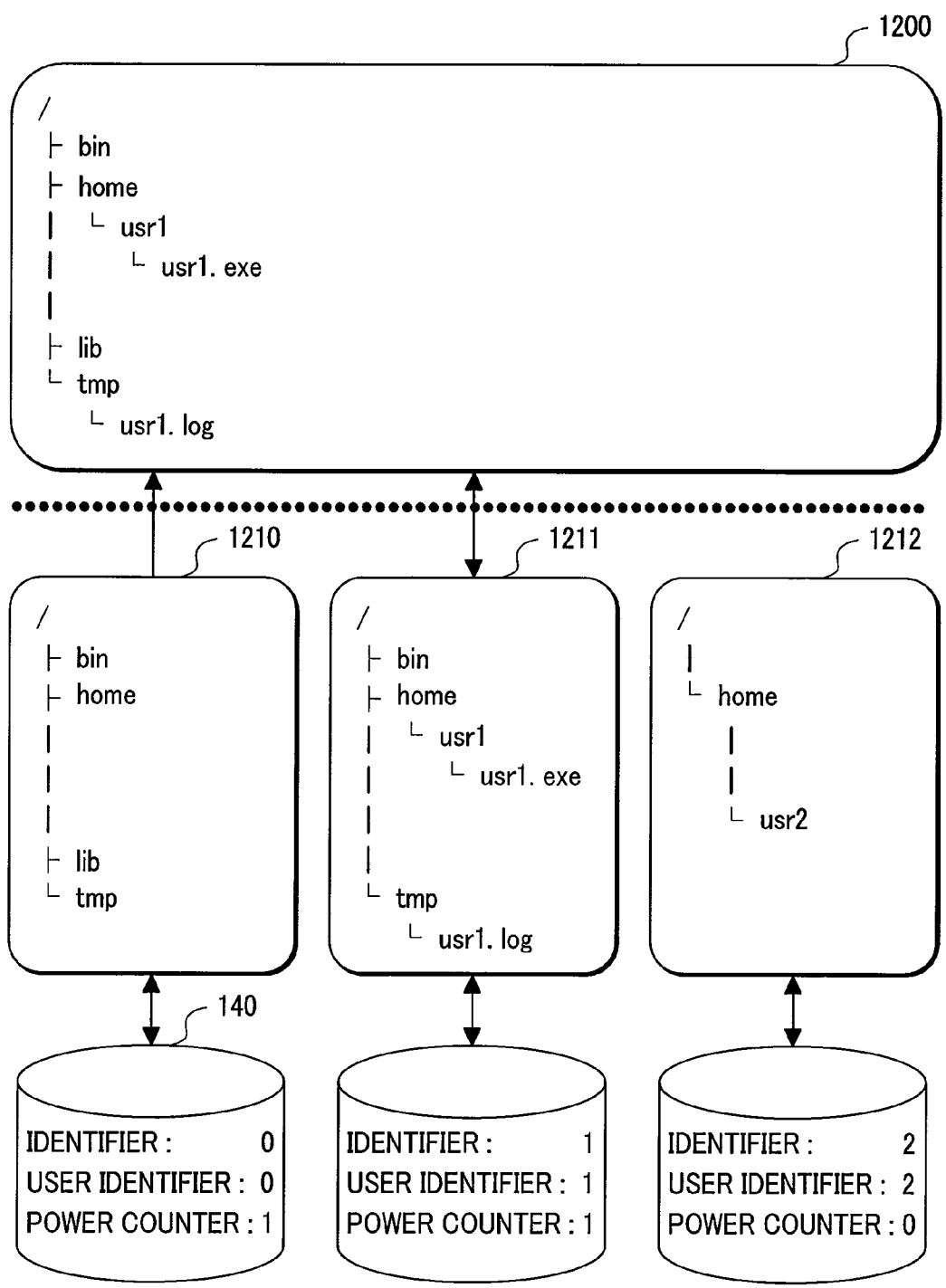
FIG. 12 is an explanatory drawing showing a directory structure view in the first embodiment.

FIG. 12 is an explanatory drawing showing a directory structure view 1200 in this embodiment.

The directory structure view 1200 is a directory structure viewable to users who use the computer system.

Directory structures 1210, 1211, and 1212 each show file locations in storage devices 140 allocated based on user's information.

The file system program 120 makes an overlap of the directory structures 1210 and 1211 of storage devices 140 the power to which is on appear as the directory structure view 1200 to users who use the computer.

Therefore, according to this embodiment, in the file system program 120, the storage device allocation means 121 and the storage device selection means 122 control storage devices in which files are located, based on information of users who use the computer system, and the storage device power-on means 124 and the storage device power-off means 126 control power to storage devices, based on information of users who use the computer system, thereby increasing the effect of reducing the power consumption of the storages. The access start prediction means 123 and the access end prediction means 125 control power to storage devices when users log in to or log out from the computer system, thereby preventing access to a file from a user-executed program from timing out.

Second Embodiment

Figure 13:
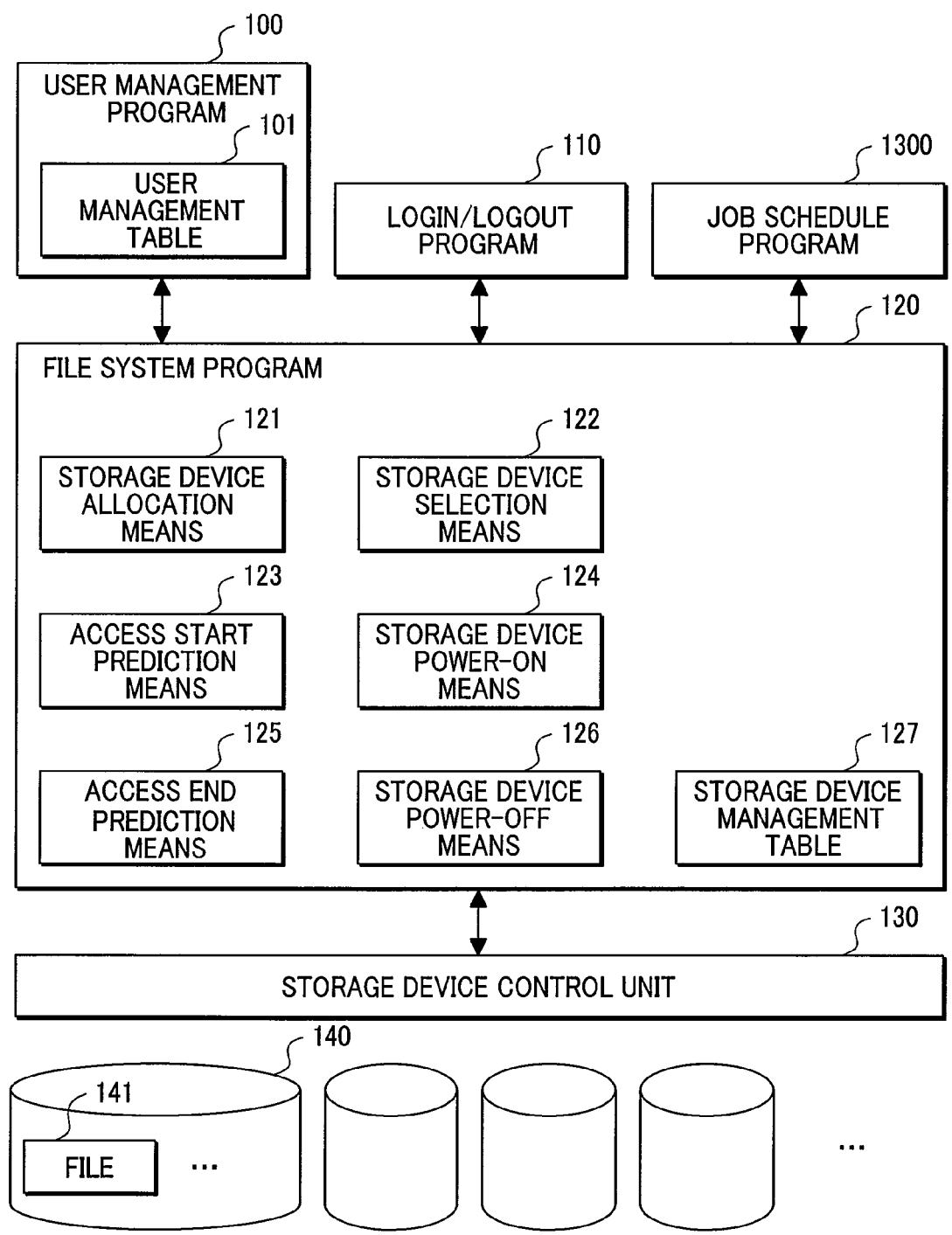
FIG. 13 is a schematic block diagram showing a computer system in a second embodiment.

FIG. 13 is a schematic block diagram showing a computer system in a second embodiment of the present invention. This embodiment will be described, centering on differences from the first embodiment.

The computer system in this embodiment includes a job schedule program 1300, in addition to the configuration of the computer system of the above-described first embodiment.

The job schedule program 1300 holds jobs of users registered in the computer system and schedules their execution. Moreover, the job schedule program 1300, when starting or terminating the execution of held jobs, consults the user management table 101 to acquire user's information and pass it to the file system program 120.

Figure 14:
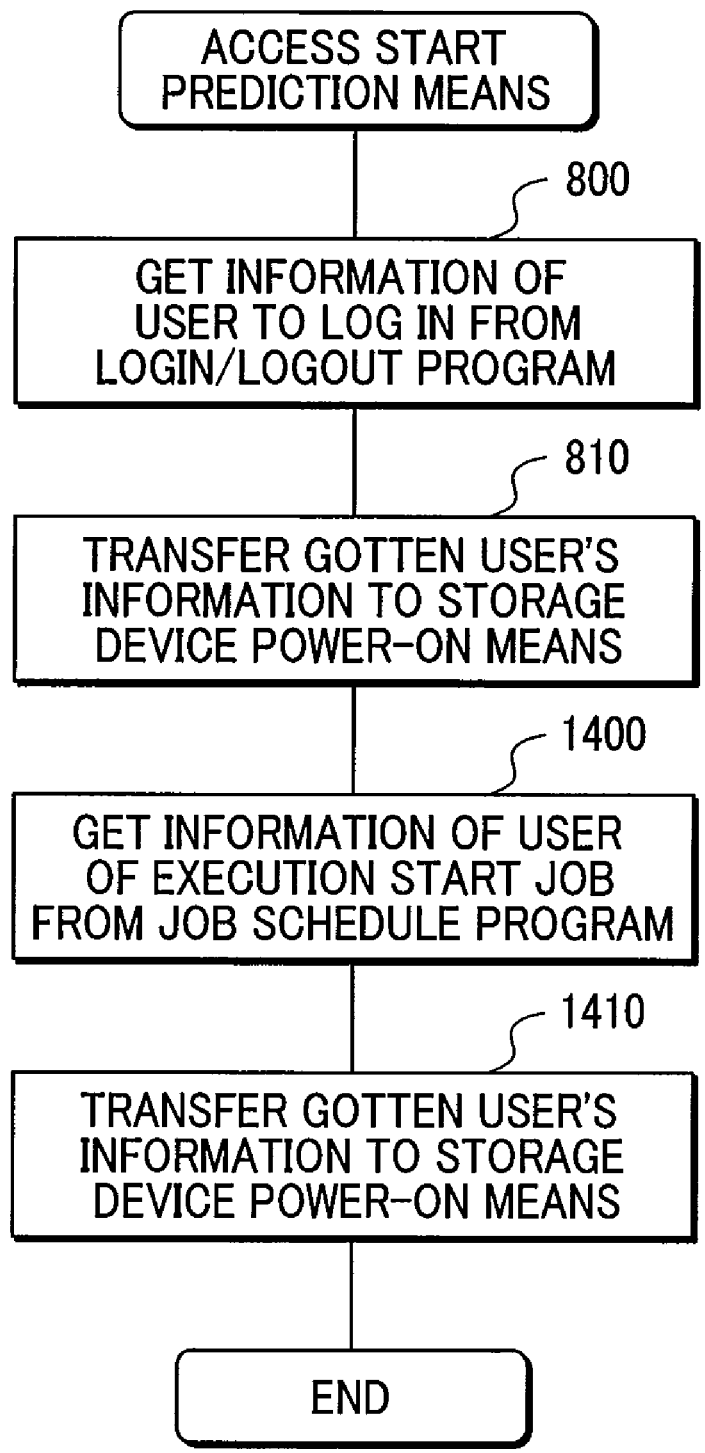
FIG. 14 is a flowchart showing processing of access start prediction means in the second embodiment.

FIG. 14 shows a flowchart of processing of the access start prediction means 123 in this embodiment.

The access start prediction means 123 in this embodiment includes steps on the job schedule program 1300, in addition to the steps of the access start prediction means 123 of the above-described first embodiment.

Step 1400 gets user's information of a job to start execution from the job schedule program 1300.

Step 1401 passes the acquired user's information to the storage device power-on means 124, and the processing terminates.

Figure 15:
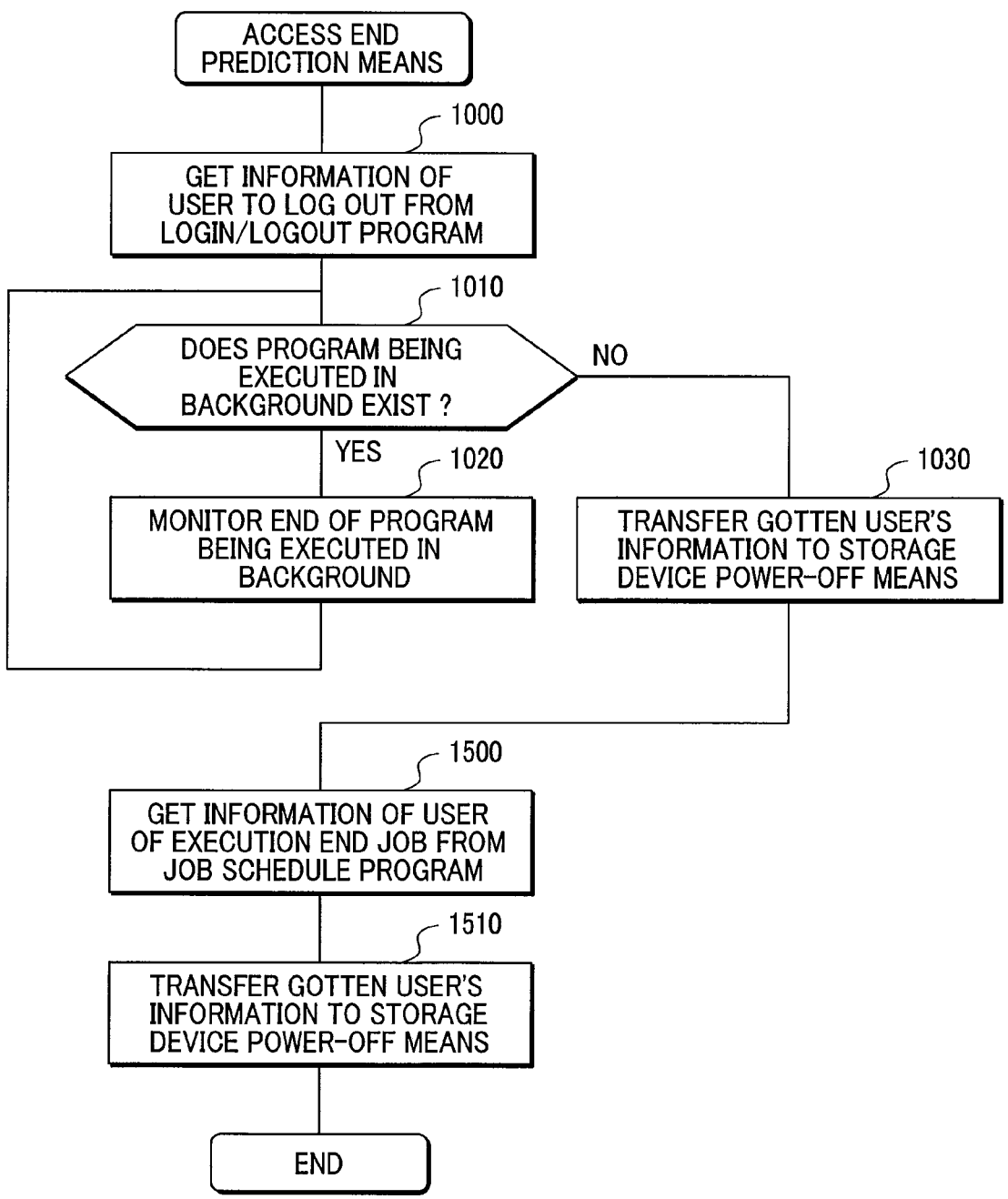
FIG. 15 is a flowchart showing processing of access end prediction means in the second embodiment.

FIG. 15 shows a flowchart of processing of the access end prediction means 125 in this embodiment.

The access end prediction means 125 in this embodiment includes a step on the job schedule program 1300, in addition to the steps of the access end prediction means 125 of the above-described first embodiment.

Step 1500 gets user's information of a job having been executed from the job schedule program 1300.

Step 1501 passes the gotten user's information to the storage device power-off means 126, and the processing terminates.

Therefore, according to this embodiment, in the file system program 120, the access start prediction means 123 and the access end prediction means 125 control power to storage devices when execution of held jobs is started or terminated, thereby preventing access to a file from the jobs from timing out and increasing the effect of reducing power consumption of the storages.

Third Embodiment

A general construction of a computer system in the third embodiment is the same as that of the computer systems in the first or second embodiment. This embodiment will be described, centering on differences from the first or second embodiment.

Figure 16:
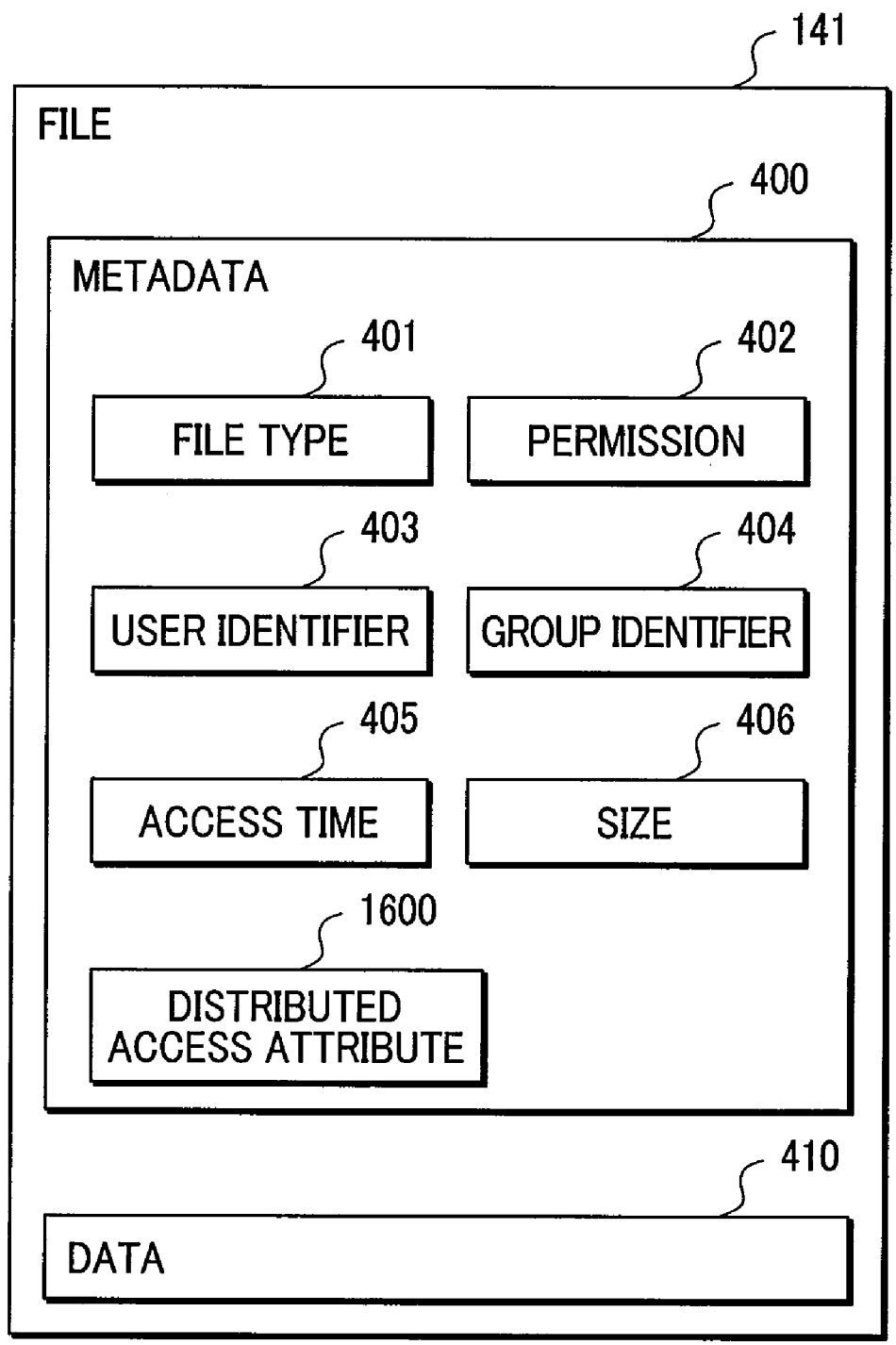
FIG. 16 is an explanatory drawing showing file in a third embodiment.

FIG. 16 is an explanatory drawing showing a file 141 in this embodiment. Metadata 400 of the file 141 in this embodiment has an attribute 1600 indicating distributed access to the file, in addition to the information of the metadata 400 of the first or second embodiment.

FIG. 17 is an explanatory drawing showing a storage device management table 127 in this embodiment. The storage device management table 127 in this embodiment has a column 1700 indicating the identifier of a storage device 140 in which the file 141 is split and located, in addition to the columns of the storage device management table 127 of the first or second embodiment.

Figure 18:
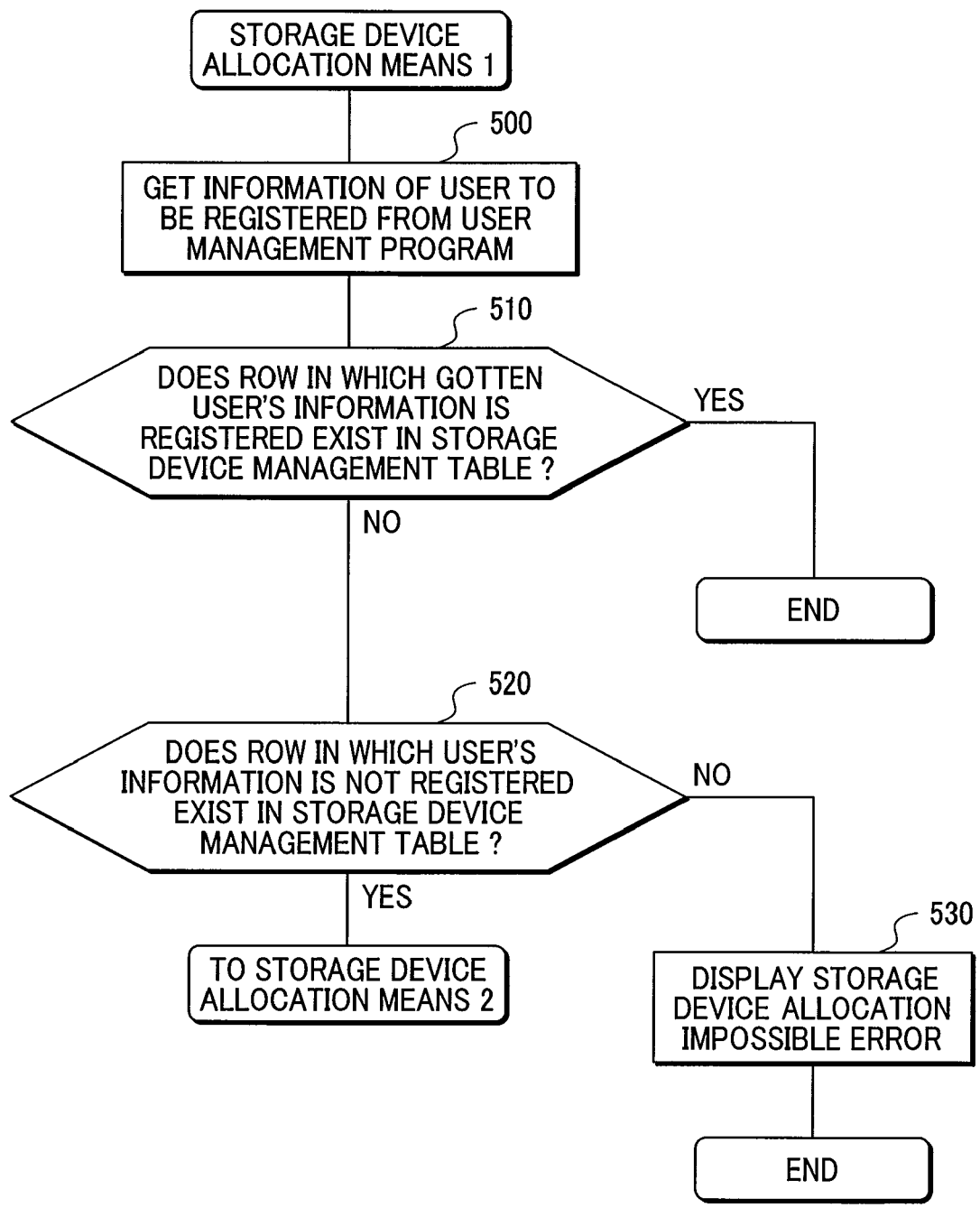
FIG. 18 is a flowchart showing processing of storage device allocation means 1 in the third embodiment.
Figure 19:
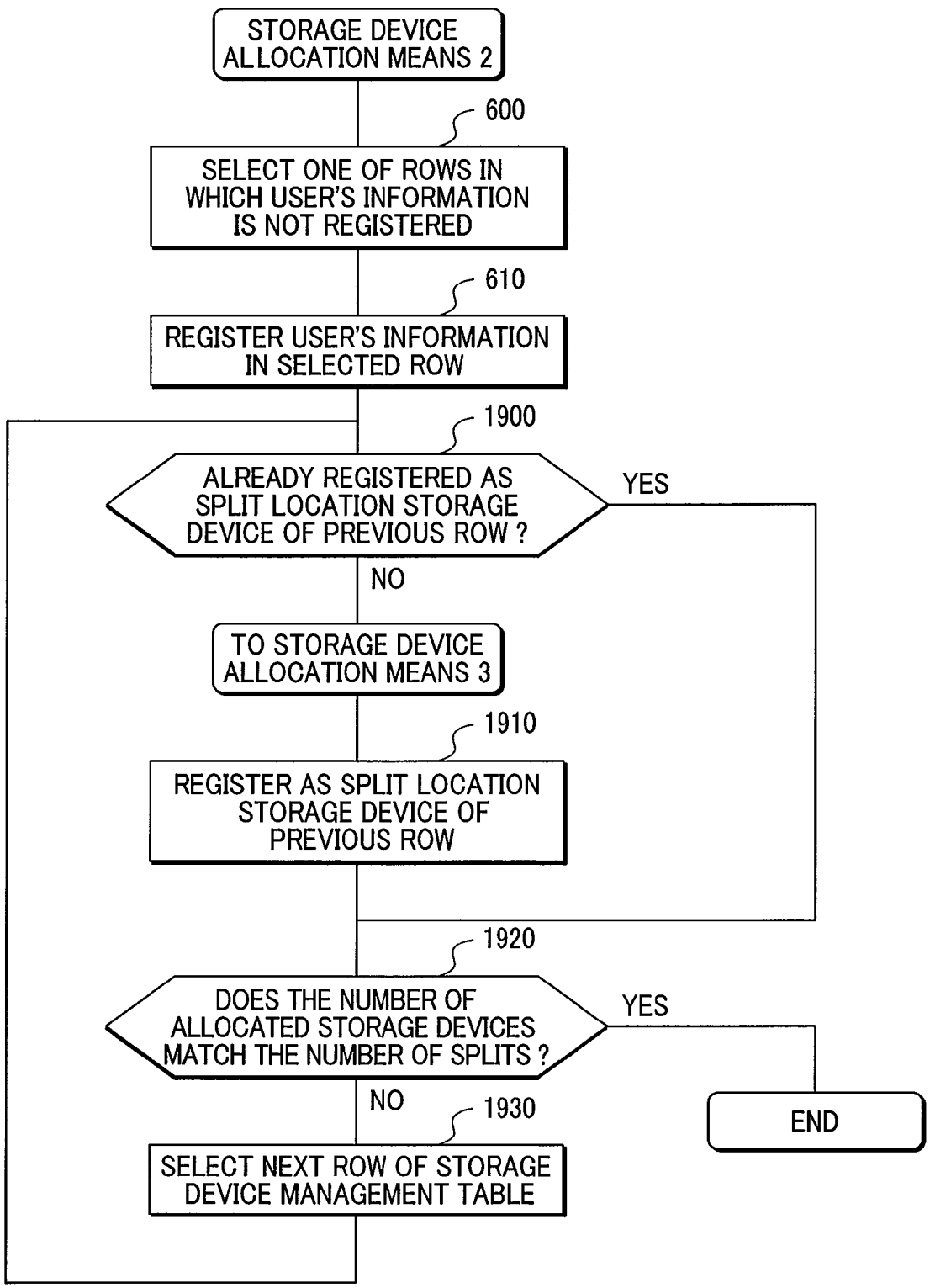
FIG. 19 is a flowchart showing processing of storage device allocation means 2 in the third embodiment.
Figure 20:
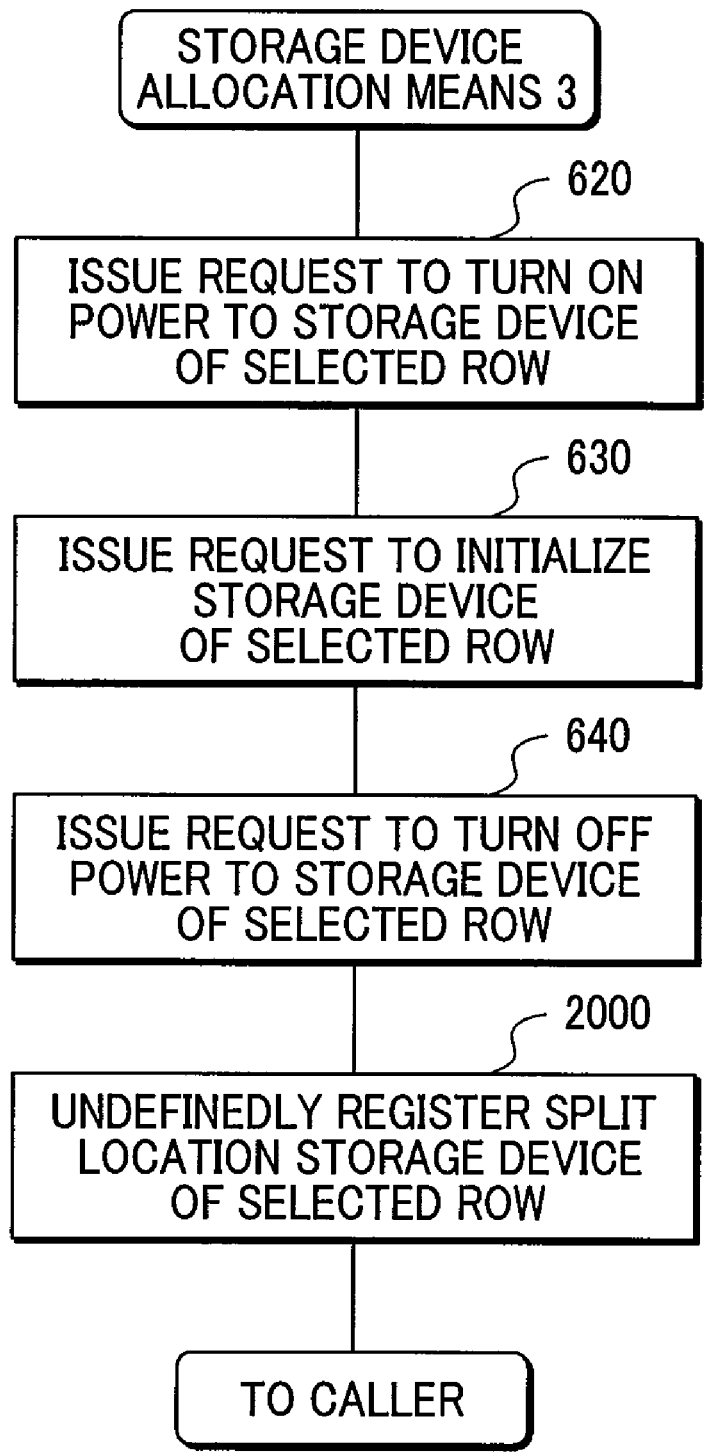
FIG. 20 is a flowchart showing processing of storage device allocation means 3 in the third embodiment.

FIGS. 18, 19, and 20 show flowcharts of processing of storage device allocation means 121 in this embodiment.

The storage device allocation means 121 in this embodiment includes steps on the storage device 140 in which the file 141 is split and located, in addition to the steps of the storage device allocation means 121 of the first or second embodiment. This embodiment assumes that the storage device 140 in which the split file 141 is located can be allocated to other users. In this embodiment, as a storage device 140 in which the split file 141 is located, a storage device 140 of a continuous row of the storage device management table 127 is allocated.

Step 1900 of FIG. 19 determines whether an identifier of the column 300 of the selected row is registered in the column 1700 of a previous row.

In that case, since a storage device 140 having an identifier of the column 300 of the selected row does not need to be initialized, Step 1900 proceeds to Step 1920. Otherwise, control proceeds to Step 620 of FIG. 20.

Step 1910 registers an identifier of the column 300 to an identifier of the column 1700 of a previous row.

Step 1920 determines whether the number of allocated storage devices 140 matches the number of splits of the file 141.

In that case, the processing terminates. Otherwise, control proceeds to Step 1930.

Step 1930 selects the next row of the storage device management table 127, and returns to Step 1900.

Step 2000 of FIG. 20 registers an identifier indicating that the next storage device 140 in which the file 141 is split and located is undefined, to an identifier of the column 1700 of a selected row. In this embodiment, as an identifier indicating that the next storage device 140 in which the file 141 is split and located is undefined, an identifier of the column 300 of the selected row is used.

Figure 21:
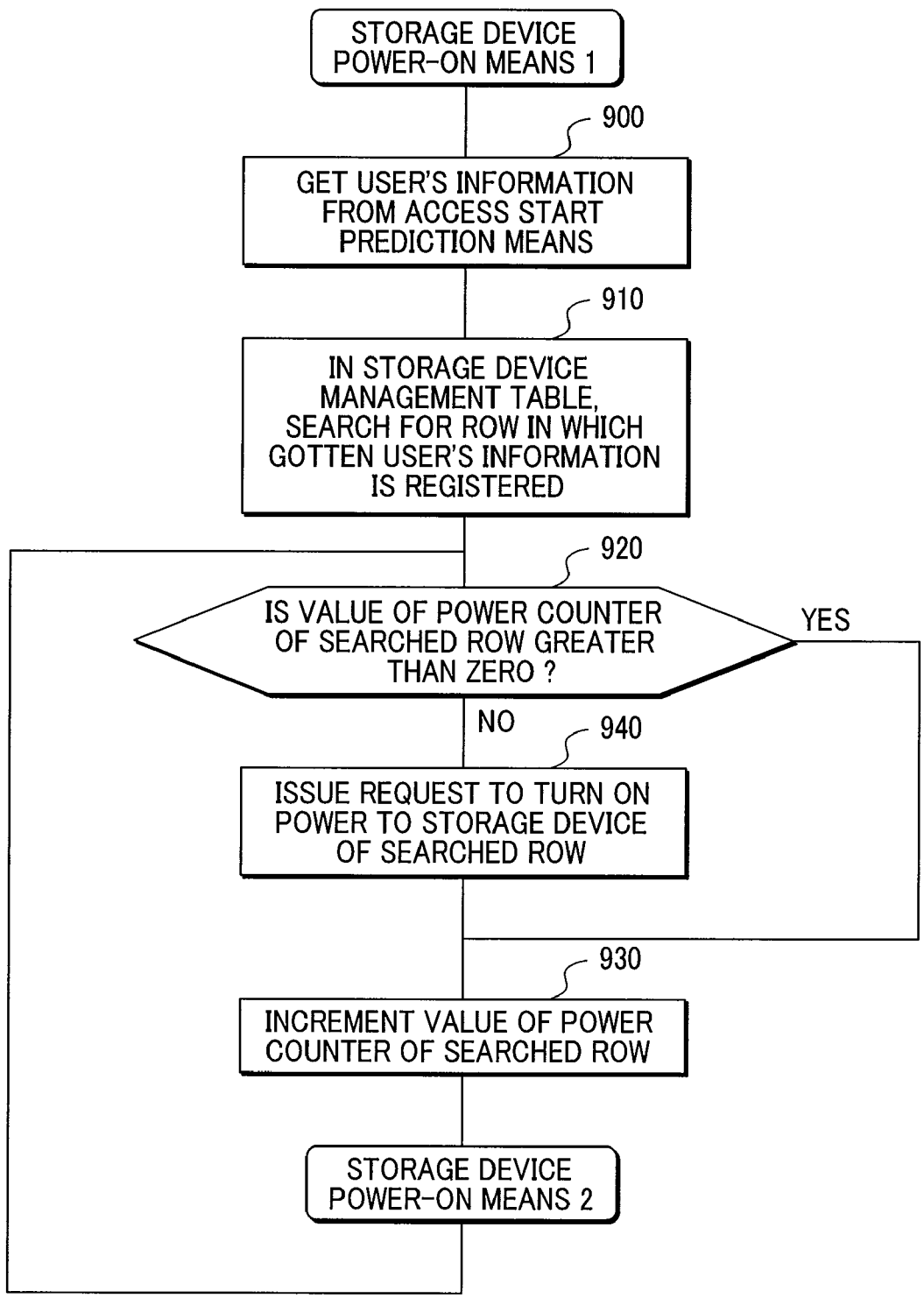
FIG. 21 is a flowchart showing processing of storage device power-on means 1 in the third embodiment.
Figure 22:
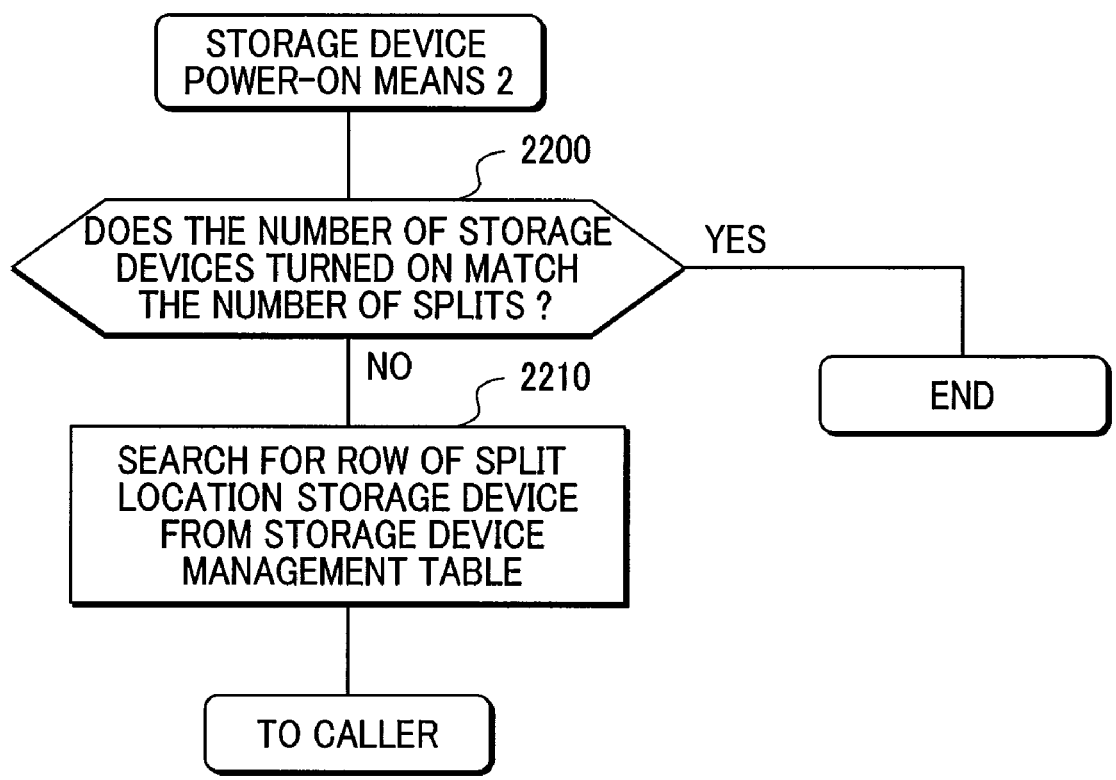
FIG. 22 is a flowchart showing processing of storage device power-on means 2 in the third embodiment.

FIGS. 21 and 22 show flowcharts of processing of the storage device power-on means 124 in this embodiment.

The storage device power-on means 124 in this embodiment includes steps on the storage device 140 in which the file 141 is split and located, in addition to the steps of the storage device power-on means 124 of the first and second embodiments.

Step 2200 of FIG. 22 determines whether the number of the storage devices 140 the power of which is turned on matches the number of splits of the file 141.

In that case, the processing terminates. Otherwise, control proceeds to Step 2210.

Step 2210 consults the storage device management table 127 to search a row for the column 300 in which an identifier of the column 1700 of the searched row is registered, and returns to Step 920 of FIG. 21.

Figure 23:
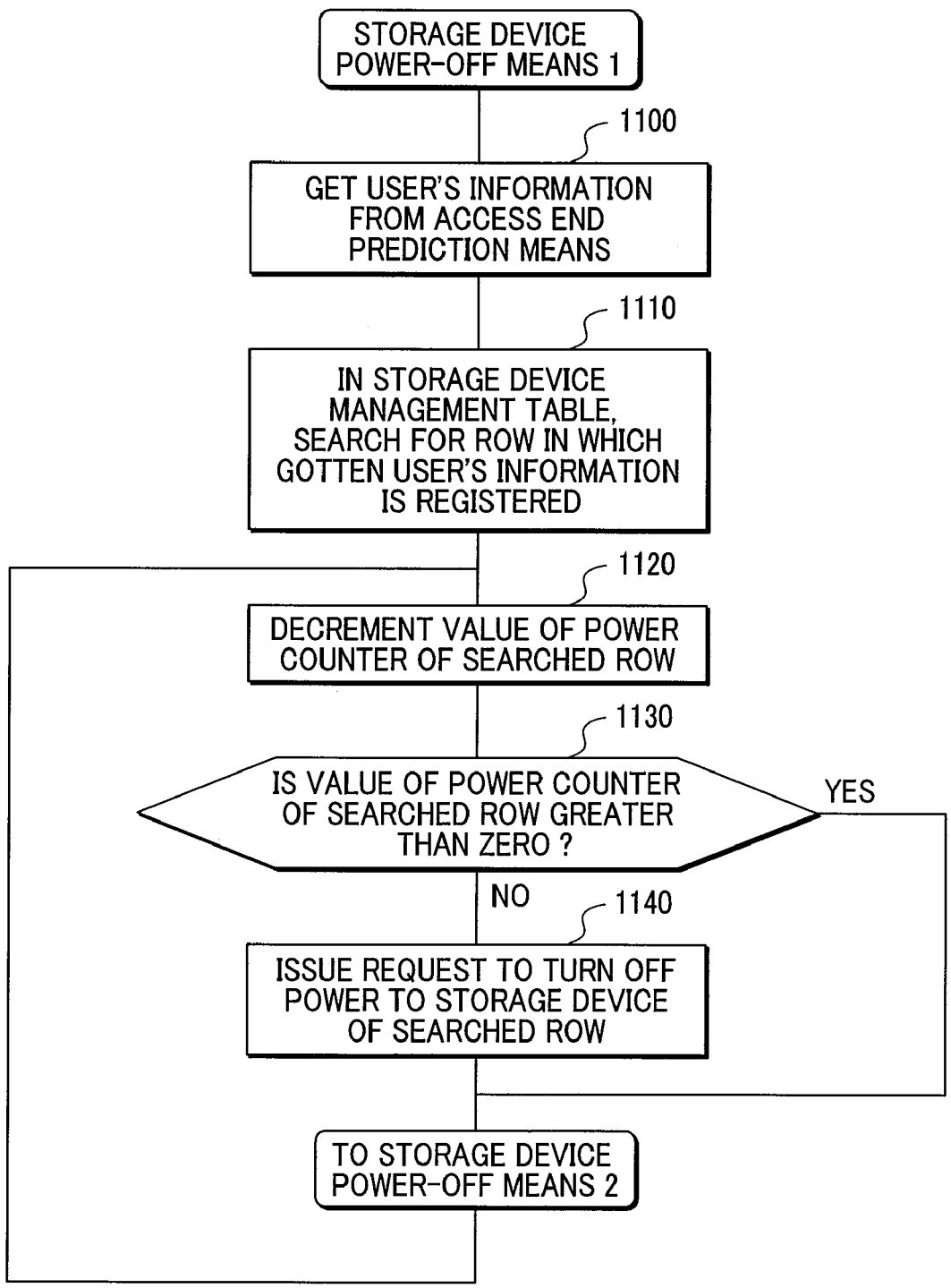
FIG. 23 is a flowchart showing processing of storage device power-off means 1 in the third embodiment.
Figure 24:
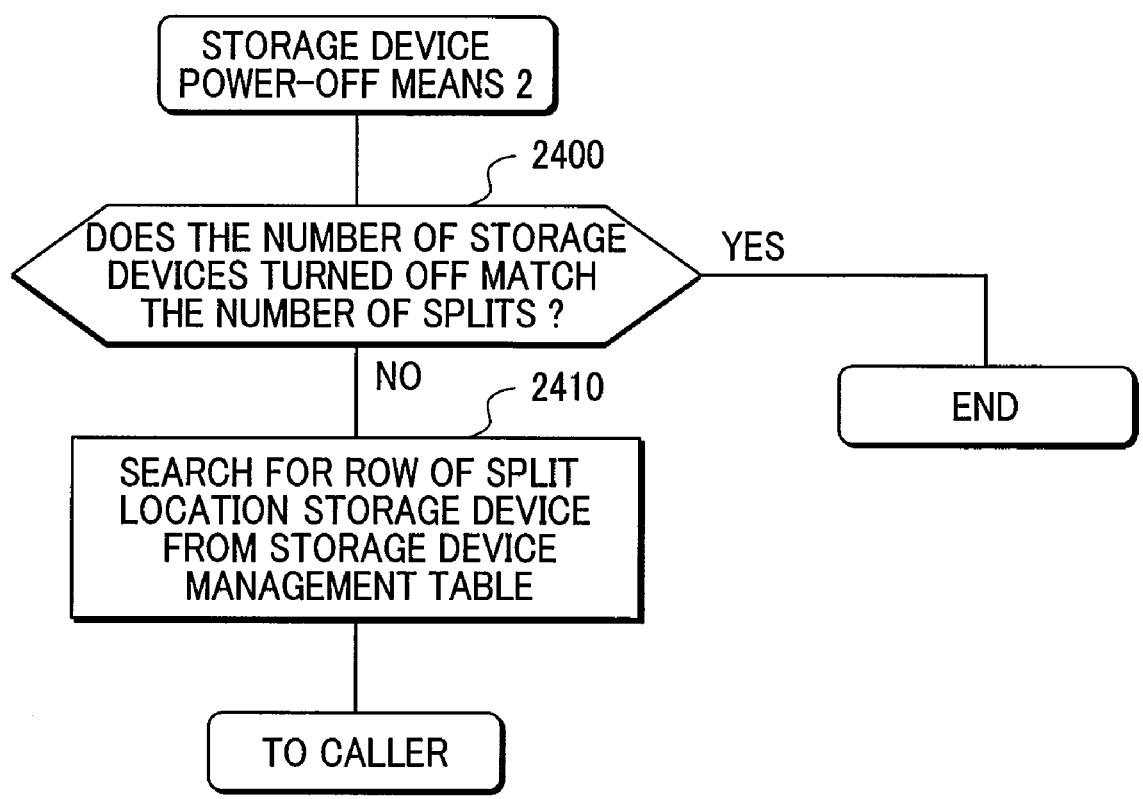
FIG. 24 is a flowchart showing processing of storage device power-off means 2 in the third embodiment.

FIGS. 23 and 24 show flowcharts of processing of the storage device power-off means 126 in this embodiment.

The storage device power-off means 126 in this embodiment includes steps on the storage device 140 in which the file 141 is split and located, in addition to the steps of the storage device power-off means 126 in the first or second embodiment.

Step 2400 of FIG. 24 determines whether the number of storage devices 140 the power to which is turned off matches the number of splits of the file 141.

In that case, the processing terminates. Otherwise, control proceeds to Step 2410.

Step 2410 consults the storage device management table 127 to search a row for the column 300 in which an identifier of the column 1700 of the searched row is registered, and returns to Step 1120 of FIG. 23.

Figure 25:
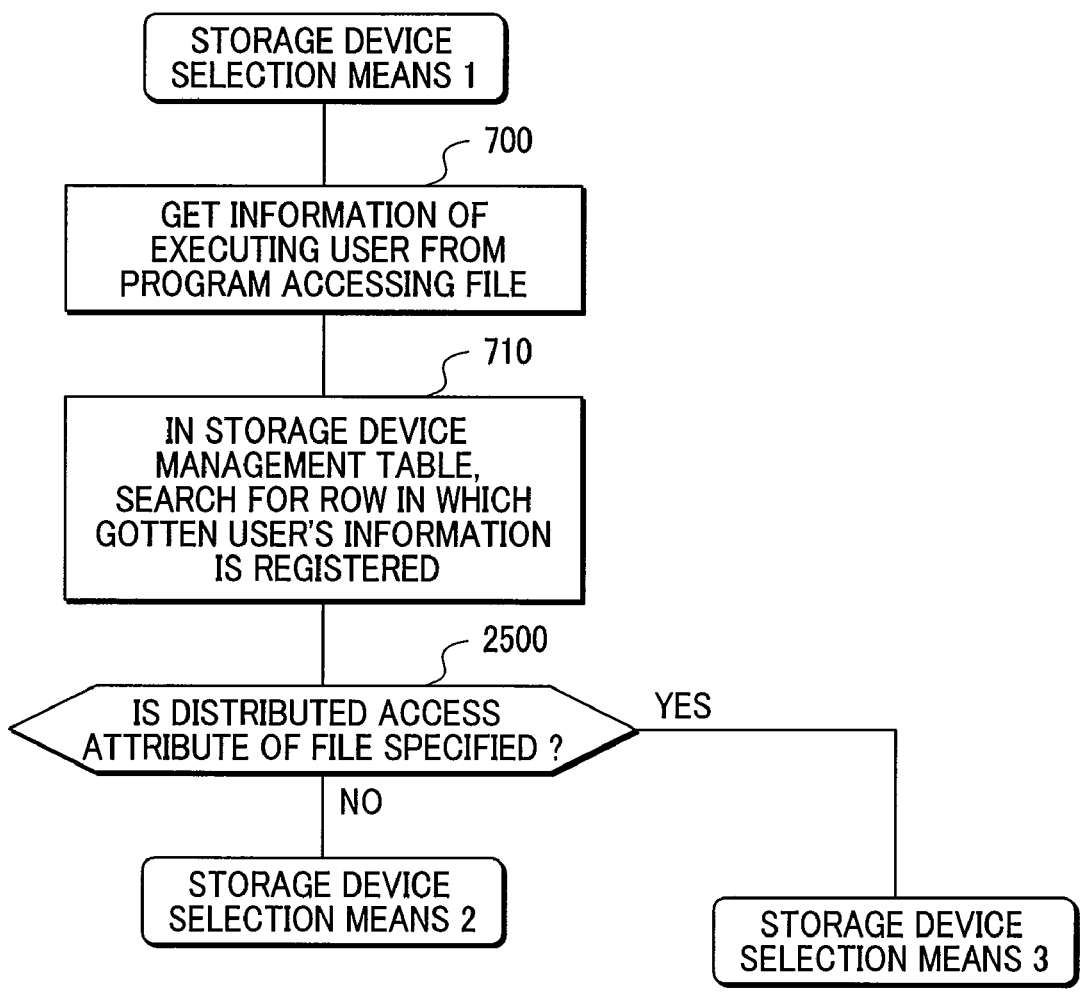
FIG. 25 is a flowchart showing processing of storage device selection means 1 in the third embodiment.
Figure 26:
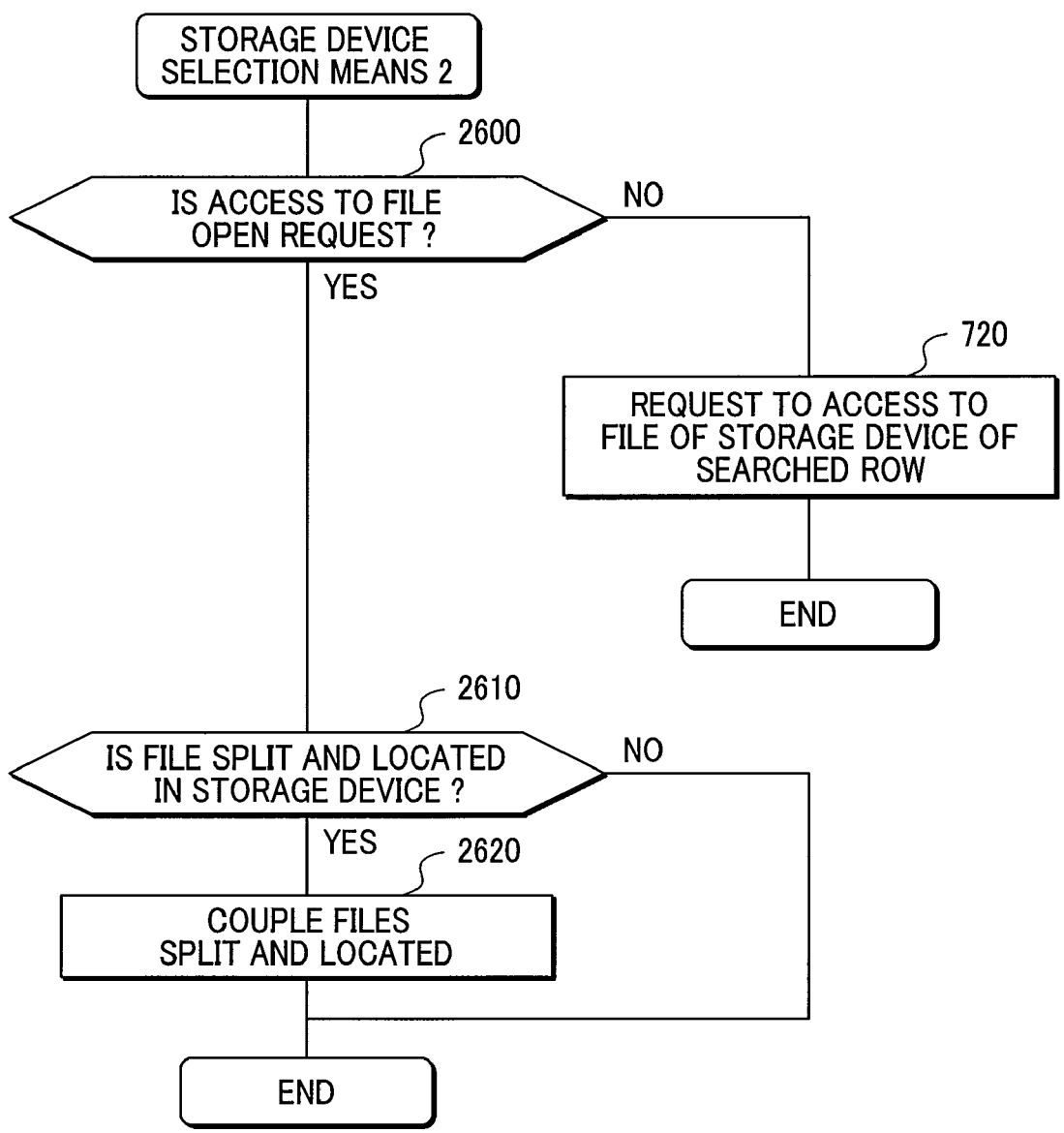
FIG. 26 is a flowchart showing processing of storage device selection means 2 in the third embodiment.
Figure 27:
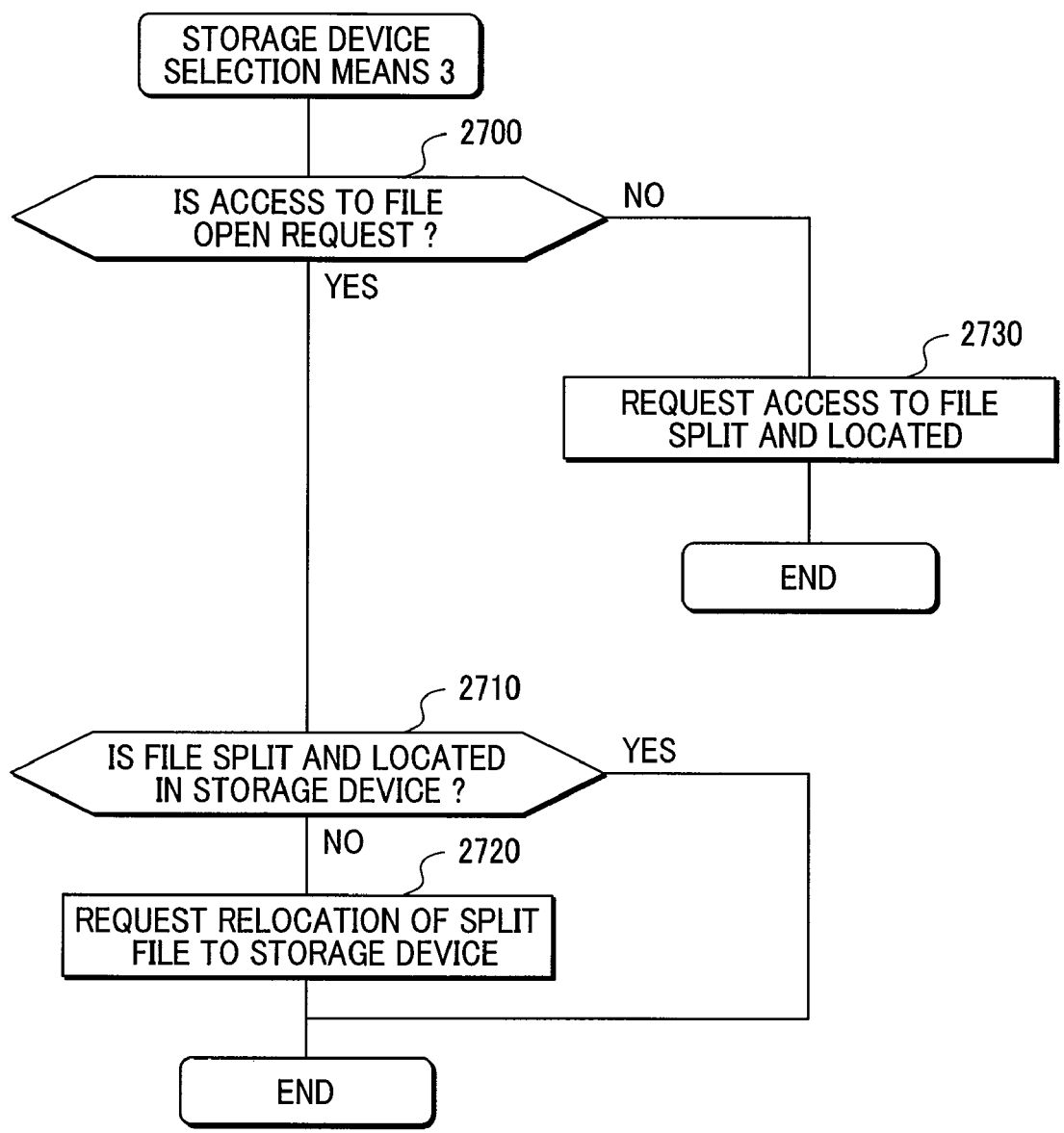
FIG. 27 is a flowchart showing processing of storage device selection means 3 in the third embodiment.

FIGS. 25, 26, and 27 show flowcharts of processing of the storage device selection means 122 in this embodiment.

The storage device selection means 122 in this embodiment includes steps on the split location of the file 141, in addition to the steps of the storage device selection means 122 of the first or second embodiment.

Step 2500 of FIG. 25 determines whether a distributed access attribute 1600 of the metadata 400 of the file 141 to be accessed is specified.

Otherwise, control proceeds to Step 2600 of FIG. 26. When the distributed access attribute 1600 is specified, control proceeds to Step 2700 of FIG. 27.

Step 2600 of FIG. 26 determines whether access to the file 141 is an open request.

In that case, control proceeds to Step 2610. Otherwise, control proceeds to Step 720.

Step 2610 determines whether the file 141 is split and located in a storage device 140 having an identifier of the column 1700 of the searched row.

Otherwise, the processing terminates. In that case, control proceeds to Step 2620.

Step 2620 searches a row for the column 300 in which an identifier of the column 1700 of a row searched is registered, according to the number of splits of the file 141, and requests the storage device control unit 130 to relocate the coupled file 141 in the storage device 140, and the processing terminates.

Step 2700 of FIG. 27 determines whether access to the file 141 is an open request.

In that case, control proceeds to step 2710. Otherwise, control proceeds to Step 2730.

Step 2710 determines whether the file 141 is split and located in a storage device 140 having an identifier of the column 1700 of the searched row.

In that case, the processing terminates. Otherwise, control proceeds to Step 2720.

Step 2720 searches a row for the column 300 in which an identifier of the column 1700 of a row searched is registered, according to the number of splits of the file 141, and requests the storage device control unit 130 to relocate the split file 141 in the storage device 140, and the processing terminates.

Step 2730 searches a row for the column 300 in which an identifier of the column 1700 of a row searched is registered, according to the number of splits of the file 141, and requests the storage device control unit 130 to distribute access to the storage device 140, and the processing terminates.

Figure 28:
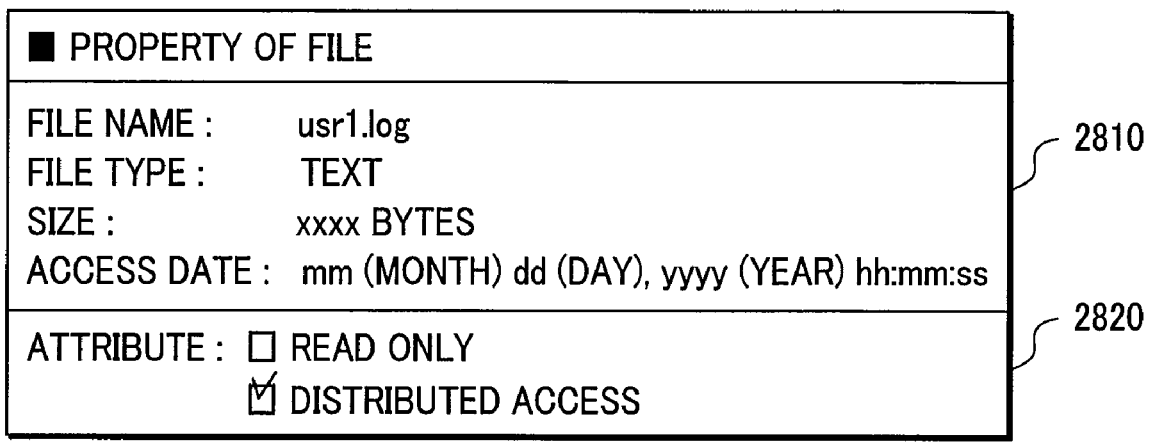
FIG. 28 is an explanatory drawing showing a file property window in the third embodiment.

FIG. 28 is an explanatory drawing showing a file property window 2800 in this embodiment;

The file property window 2800 has a field 2810 that displays information of the metadata 400 of a file 141, and a field 2820 that specifies the attributes of the metadata 400 of the file 141.

By marking the attributes of the field 2820, the distributed access attribute 1600 of the metadata 400 of the file 141 is specified, and by the storage device selection means 122, the file 141 is split and located in the storage device 140.

Figure 29:
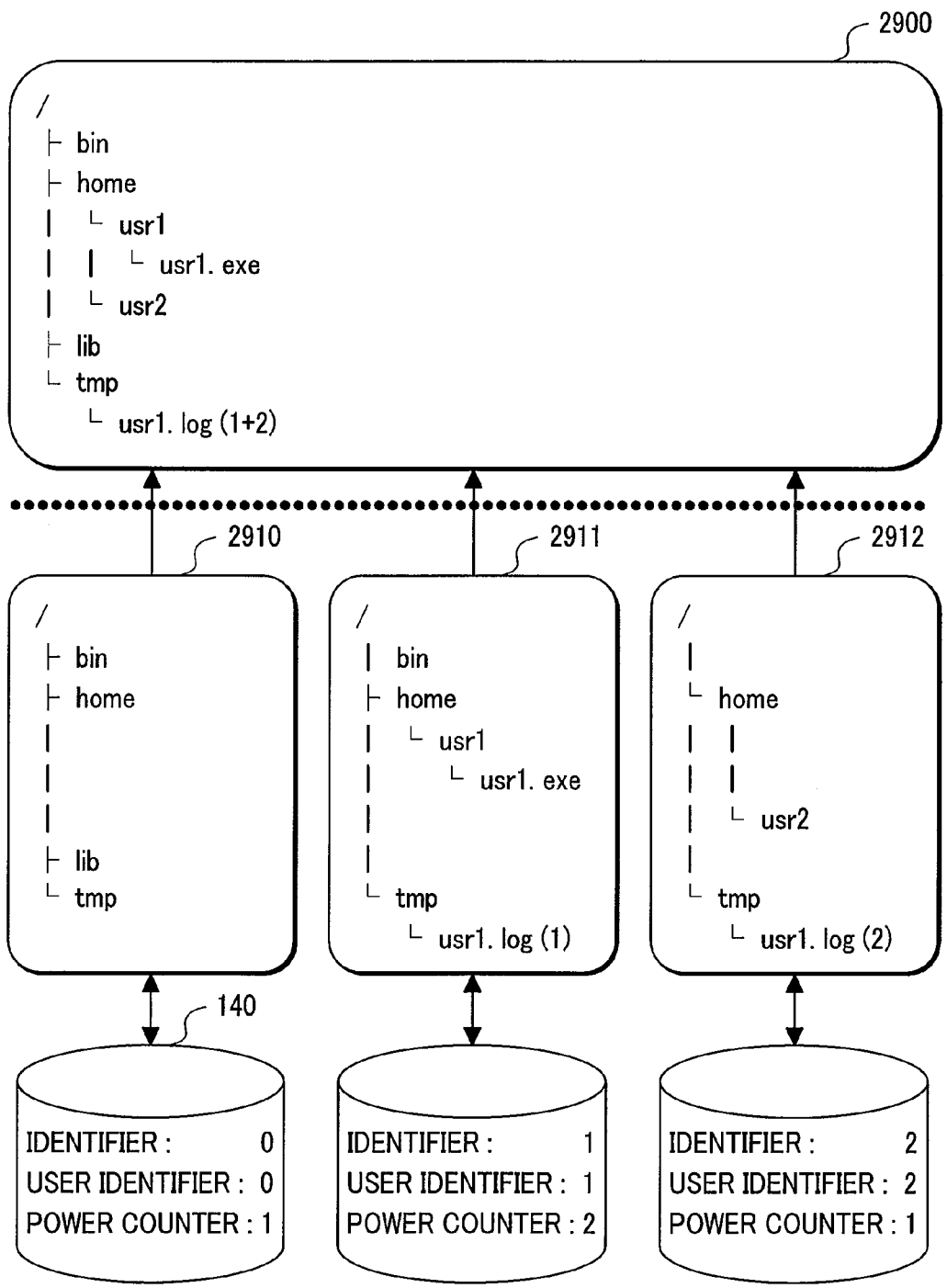
FIG. 29 is an explanatory drawing showing a directory structure view in the third embodiment.

FIG. 29 is an explanatory drawing showing a directory structure view in this embodiment.

The directory structure view 2900 is a directory structure viewable to users who use the computer system.

Directory structures 2910, 2911, and 2912 each show file locations in storage devices 140 allocated based on user's information. In this embodiment, a storage device 140 having the directory structure 2911 is also allocated as a storage device in which the split file 141 of a storage device 140 having the directory structure 2910 is located. Likewise, a storage device 140 having the directory structure 2912 is also allocated as a storage device in which the split file 141 of a storage device 140 having the directory structure 2911 is located.

The file system program 120 makes an overlap of the directory structures 2910, 2911, and 2912 of storage devices 140 the power to which is on appear as the directory structure view 2900 to users who use the computer. The file system program 120 enables access to files 141 split and located in the storage devices 140 having the directory structures 2911 and 2912.

Therefore, according to this embodiment, in the file system program 120, a file 141 specified with the distribute access attribute 1600 is split and allocated in plural storage devices by the storage device allocation means 121 and the storage device selection means 122, whereby performance of access to files can be increased while increasing the effect of reducing power consumption of storages.

Fourth Embodiment

A general construction of a computer system in a fourth embodiment of the present invention is the same as that of the computer system in the first or second embodiment. This embodiment will be described, centering on differences from the first or second embodiment.

Figure 30:
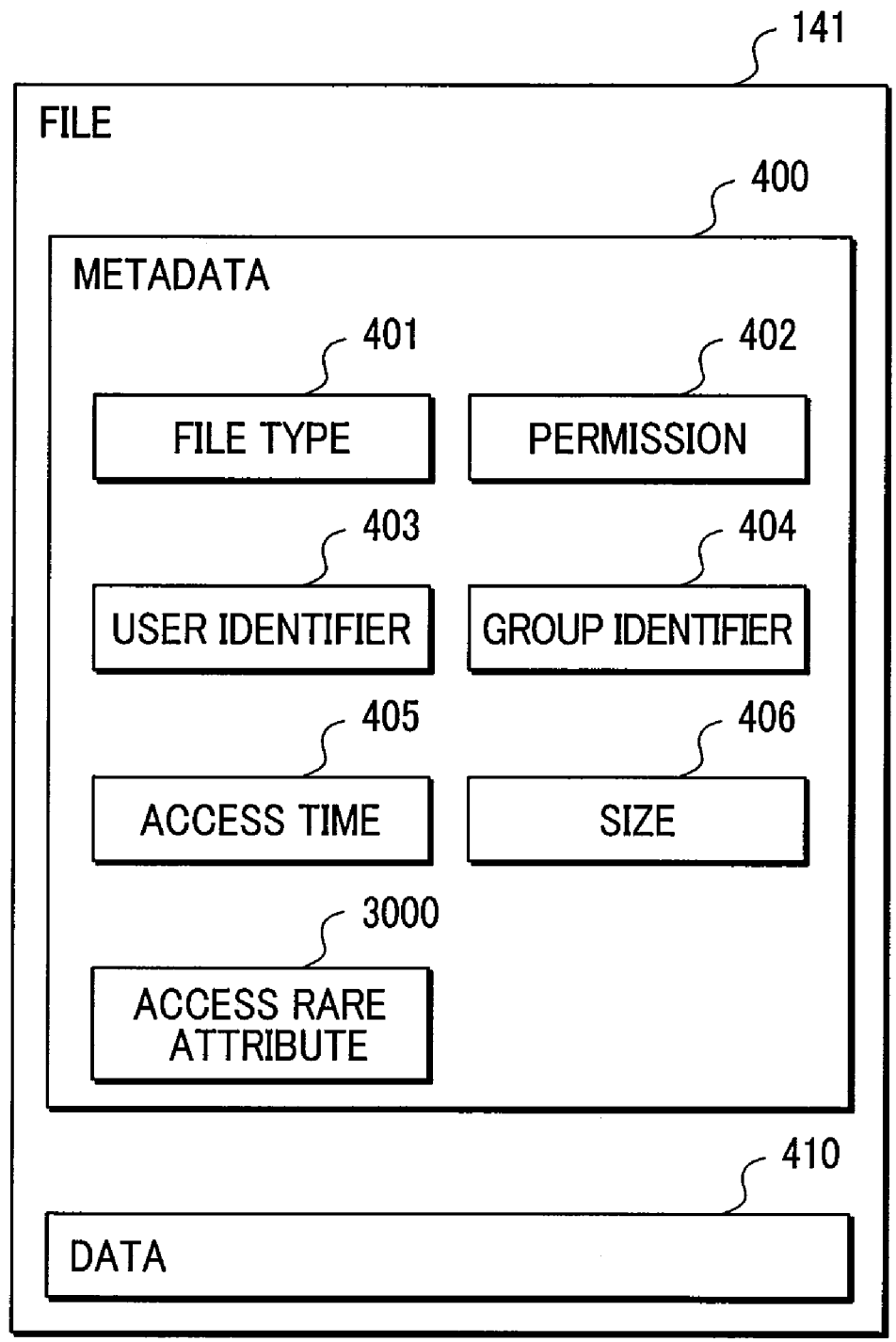
FIG. 30 is an explanatory drawing showing a file in a fourth embodiment.

FIG. 30 is an explanatory drawing showing a file 141 in this embodiment.

Metadata 400 of the file 141 in this embodiment has an attribute (access rare attribute) 3000 indicating that access to the file 141 is rare, in addition to the information of the metadata 400 of the first or second embodiment.

FIG. 31 is an explanatory drawing showing the storage device management table 127 in this embodiment.

The storage device management table 127 in this embodiment has a column 3100 showing the identifiers of storage devices 140 in which data 410 of rarely accessed files 141 is located, in addition to the columns of the storage device management table 127 of the first or second embodiment.

Figure 32:
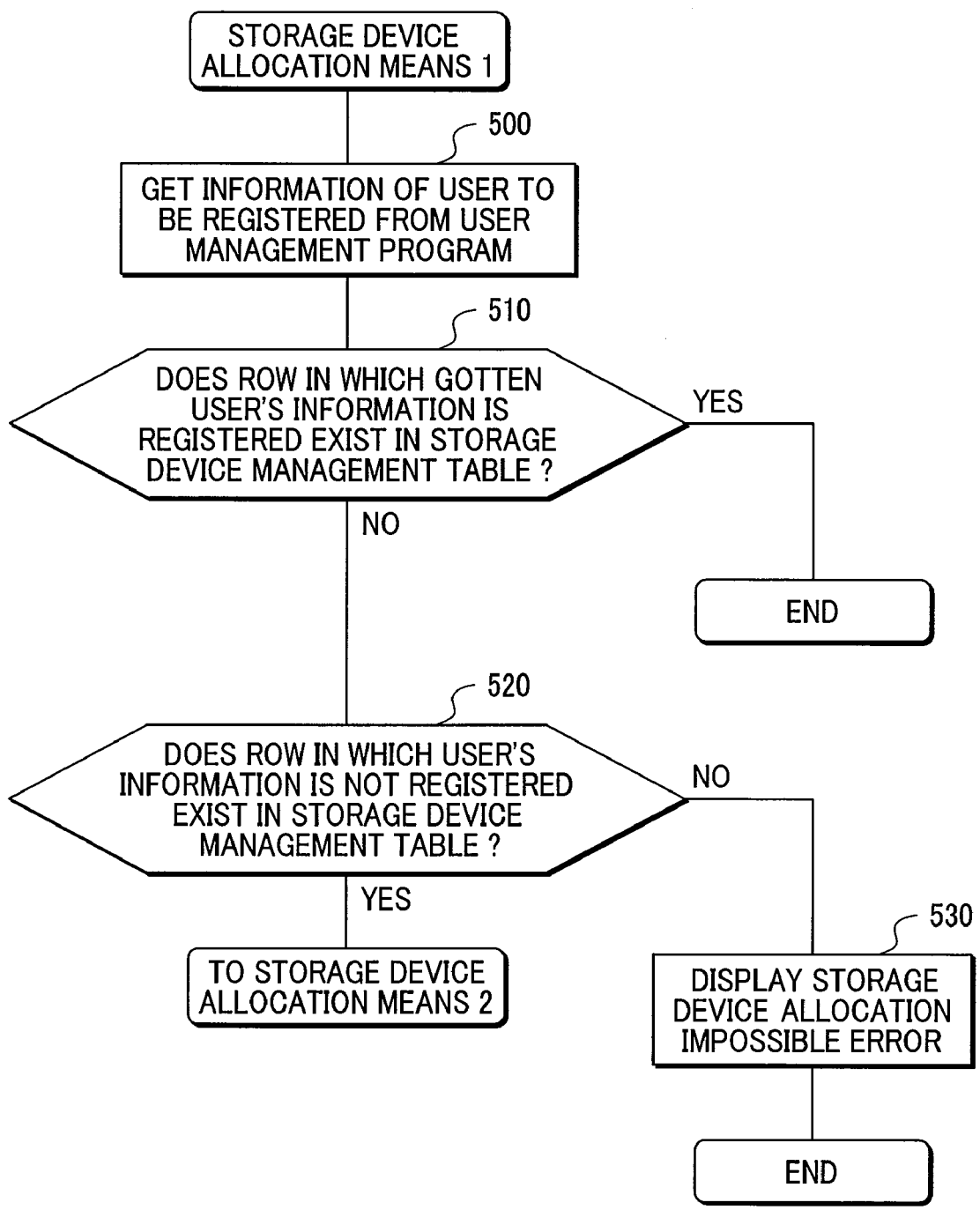
FIG. 32 is a flowchart showing processing of storage device allocation means 1 in the fourth embodiment.
Figure 33:
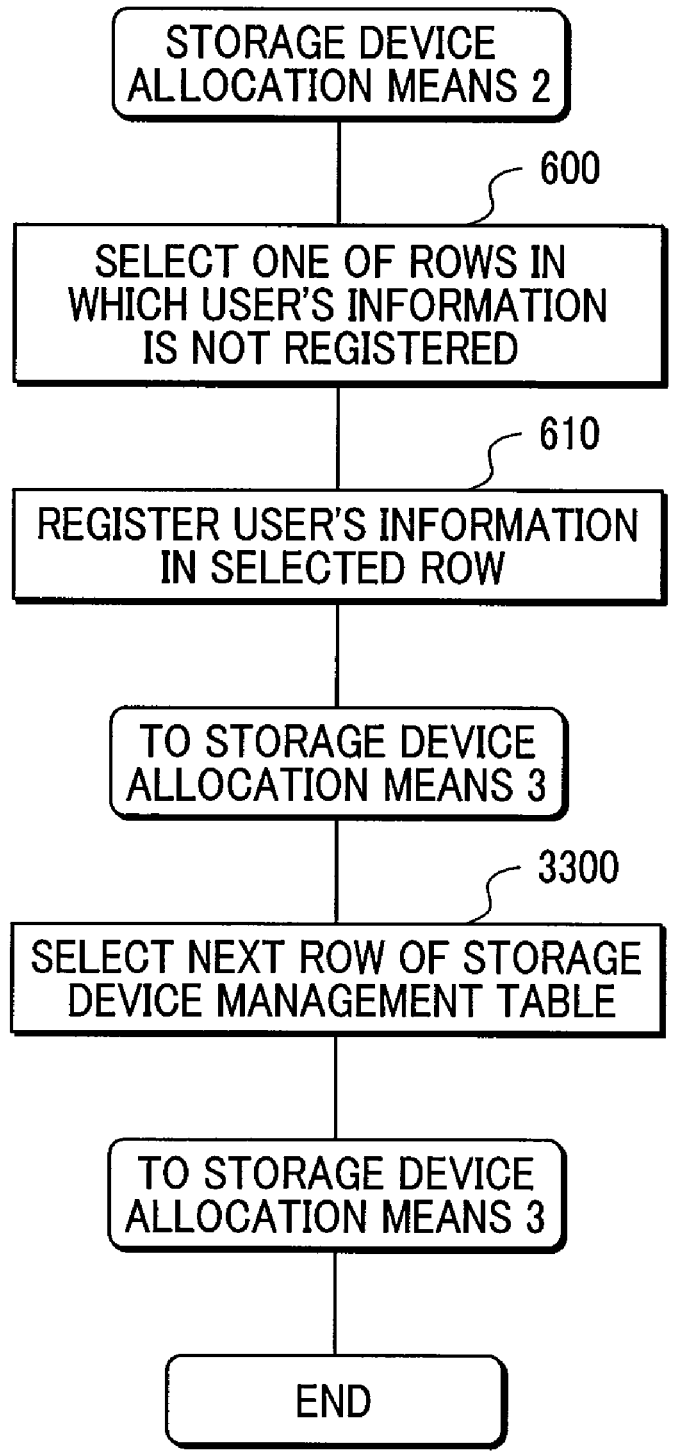
FIG. 33 is a flowchart showing processing of storage device allocation means 2 in the fourth embodiment.
Figure 34:
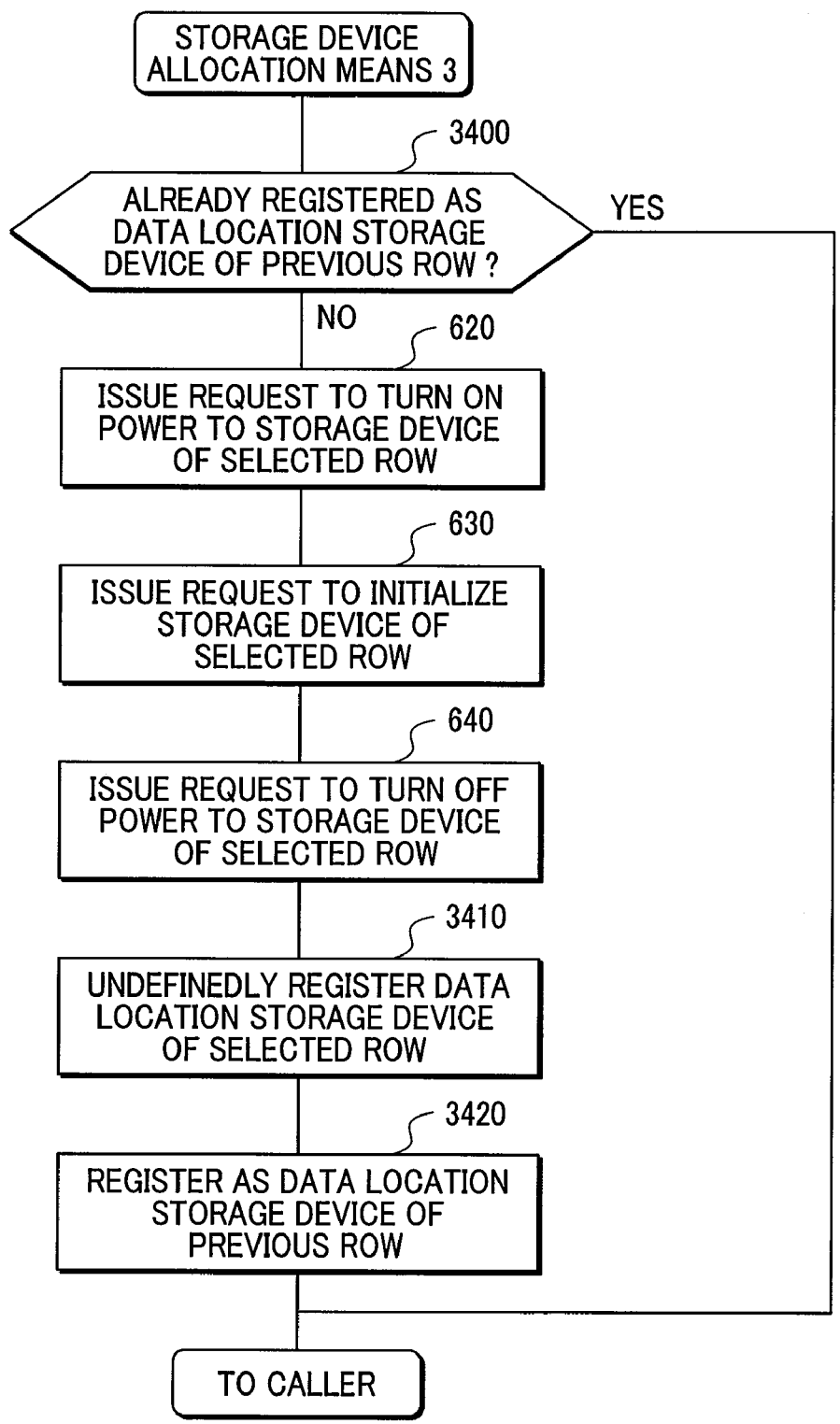
FIG. 34 is a flowchart showing processing of storage device allocation means 3 in the fourth embodiment.

FIGS. 32, 33, and 34 show flowcharts of processing of the storage device allocation means 121 in this embodiment.

The storage device allocation means 121 in this embodiment includes steps on a storage device 140 in which the data 410 of a rarely accessed file 141 is located, in addition to the steps of the storage device allocation means 121 in the first or second embodiment. This embodiment assumes that the storage device 140 in which the data 410 of a rarely accessed file 141 is located can be allocated to other users. Moreover, in this embodiment, as the storage device 140 in which the data 410 of a rarely accessed file 141 is located, a storage device 140 of the next row of the storage device management table 127 is allocated.

Step 3300 of FIG. 33 selects the next row of the storage device management table 127.

Step 3400 of FIG. 34 determines whether an identifier of the column 300 of a selected row is registered in the column 3100 of a previous row.

In that case, control returns to the caller because a storage device 140 having an identifier of the column 300 of the selected row does not need to be initialized. Otherwise, control proceeds to Step 620.

Step 3410 registers an identifier indicating that a storage device 140 in which the data 410 of a rarely accessed file 141 is located is undefined, in an identifier of the column 3100 of the selected row. In this embodiment, as an identifier indicating that a storage device 140 in which the data 410 of a rarely accessed file 141 is located is undefined, an identifier of the column 300 of the selected row is used.

Step 3420 registers an identifier of the column 300 of the selected row in an identifier of the column 1700 of the previous row.

The storage device power-on means 124 in this embodiment is the same as that in the first or second embodiment, and does not include steps on a storage device 140 in which the data 410 of a rarely accessed file 141 is located.

The storage device power-off means 126 in this embodiment is the same as that in the first or second embodiment, and does not include steps on a storage device 140 in which the data 410 of a rarely accessed file 141 is located.

FIGS. 35, 36, 37, 38, 39, and 40 show flowcharts of processing of the storage device selection means 122 in this embodiment.

The storage device selection means 122 in this embodiment includes steps on the location of a rarely accessed file 141, in addition to the steps of the storage device selection means 122 of the first or second embodiment.

Figure 35:
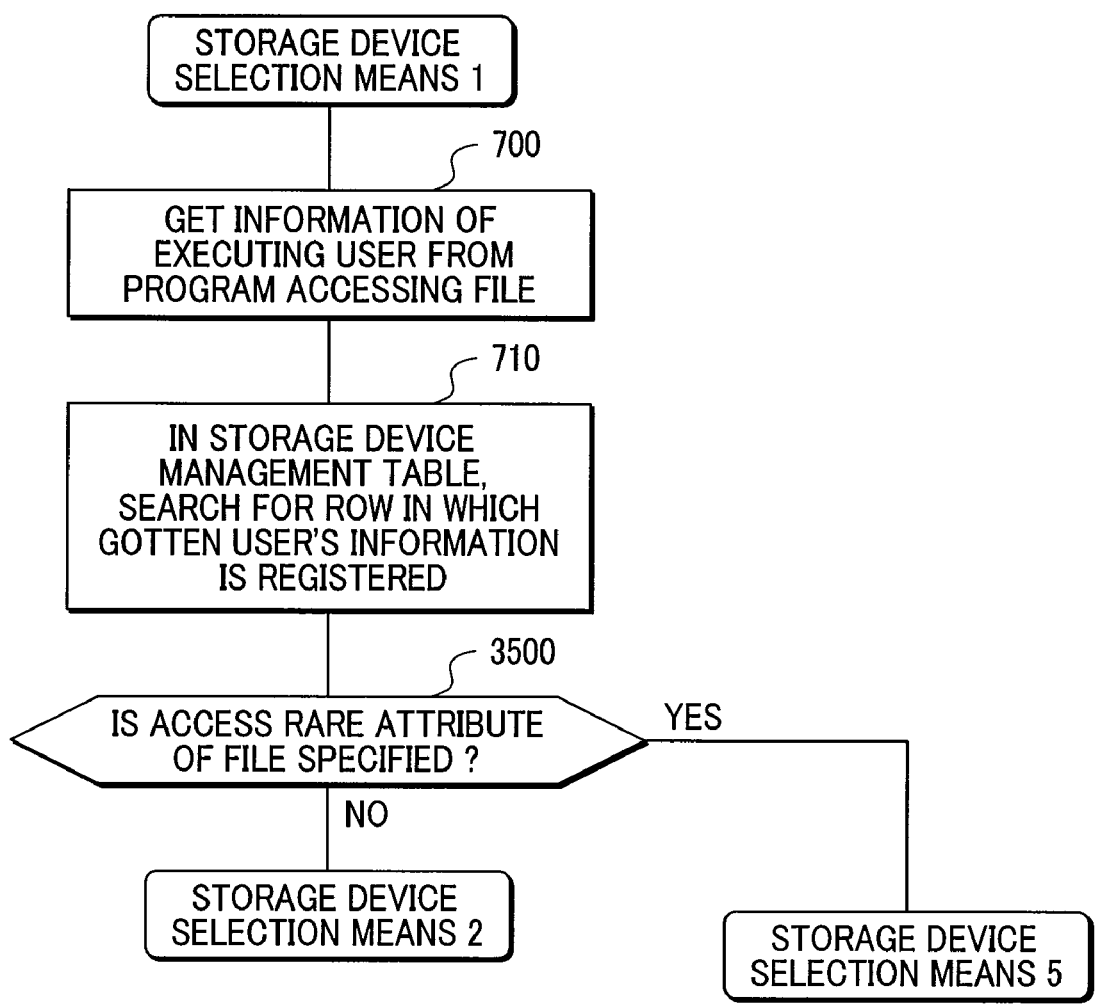
FIG. 35 is a flowchart showing processing of storage device selection means 1 in the fourth embodiment.

Step 3500 of FIG. 35 determines whether the access rare attribute 3000 of the metadata 400 of the file 141 to be accessed is specified.

Figure 36:
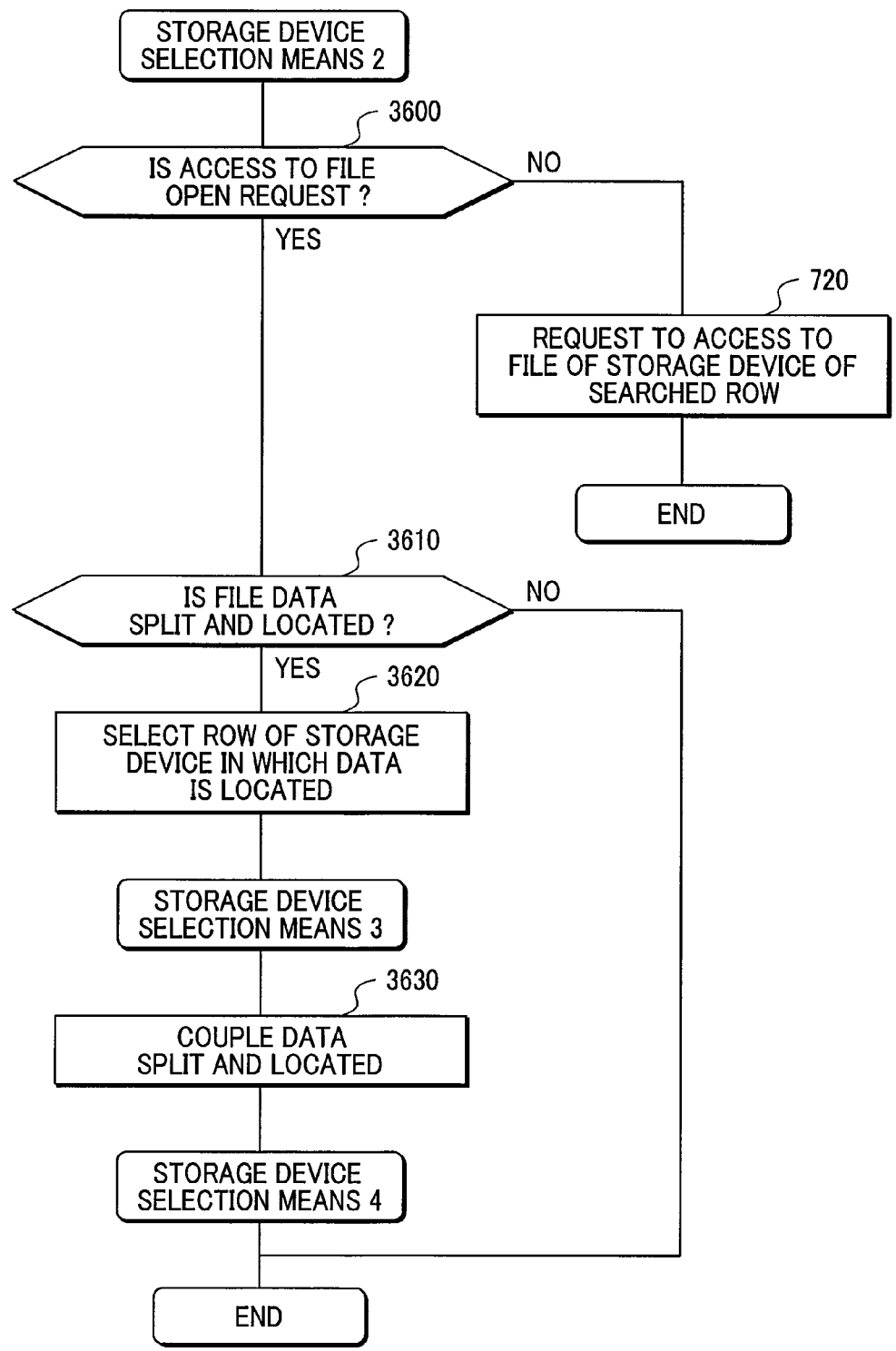
FIG. 36 is a flowchart showing processing of storage device selection means 2 in the fourth embodiment.

Otherwise, control proceeds to Step 3600 of FIG. 36. In that case, control proceeds to Step 3900 of FIG. 39.

Step 3600 of FIG. 36 determines whether access to the file 141 is an open request.

In that case, control proceeds to Step 3610. Otherwise, control proceeds to Step 720.

Step 3610 determines whether the data 410 of the file 141 is located in a storage device 140 having an identifier of the column 3100 of the searched row.

Otherwise, the processing terminates. In that case, control proceeds to Step 3620.

Figure 37:
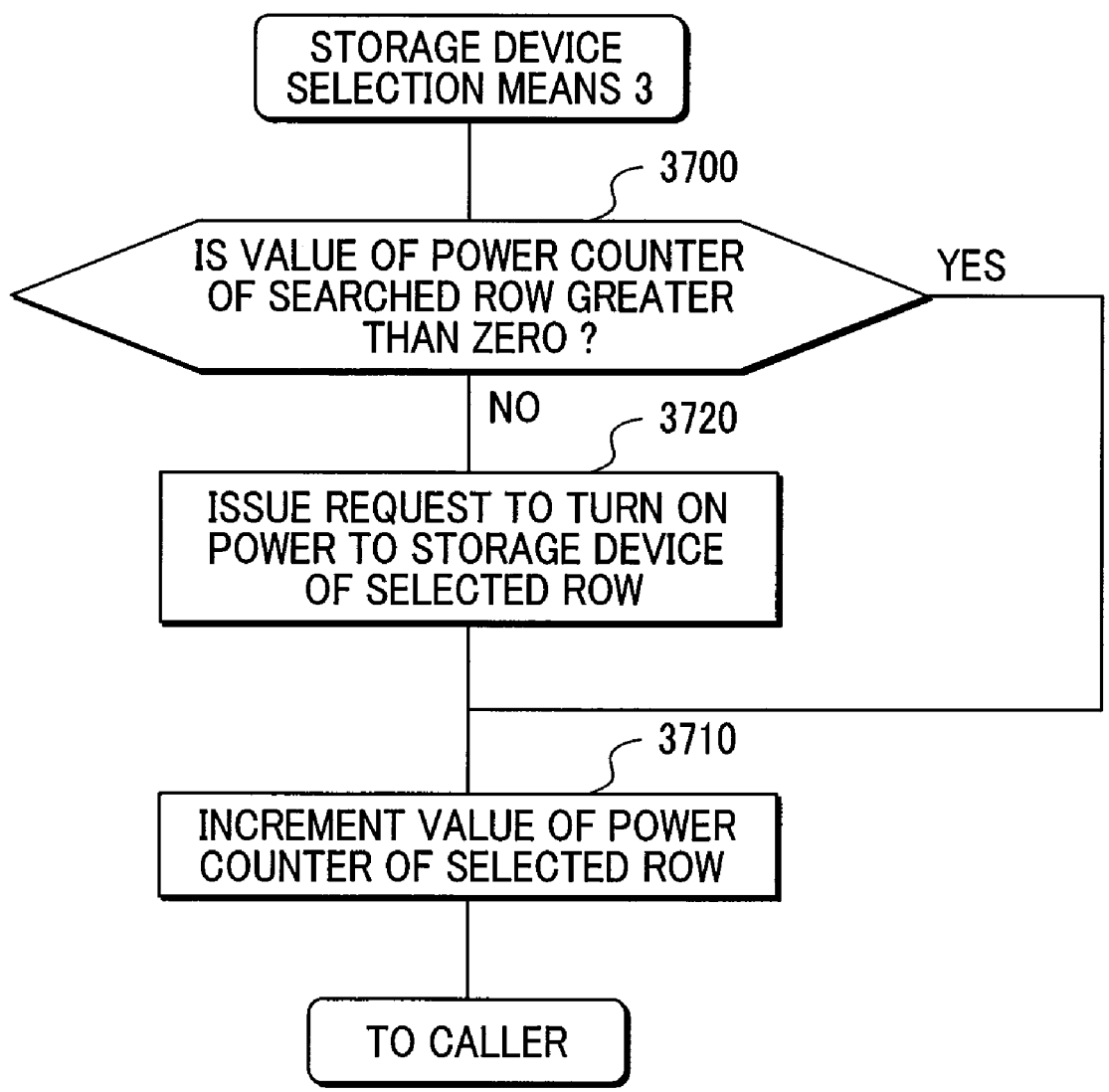
FIG. 37 is a flowchart showing processing of storage device selection means 3 in the fourth embodiment.

Step 3620 consults the storage device management table 127 to search a row for the column 300 in which an identifier of the column 3100 of the searched row is registered and select the row, and proceeds to Step 3700 of FIG. 37.

Figure 38:
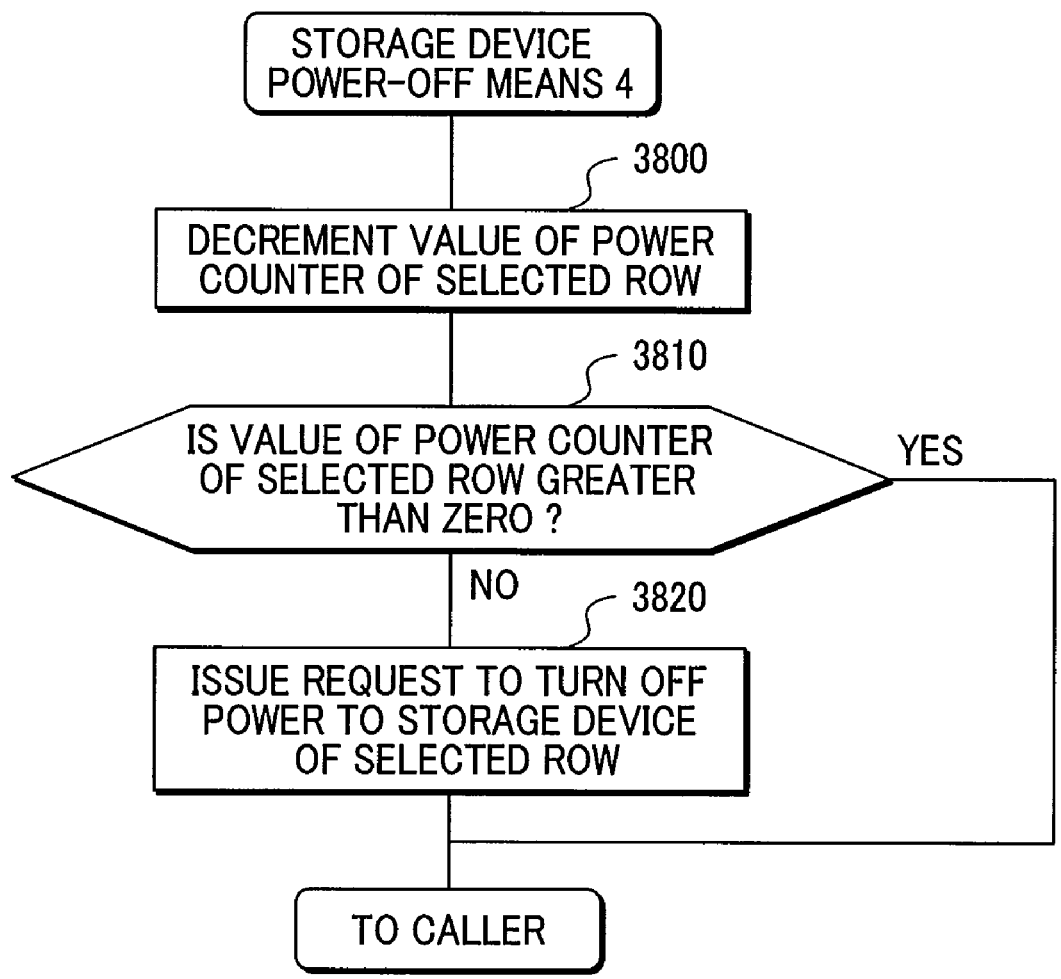
FIG. 38 is a flowchart showing processing of storage device selection means 4 in the fourth embodiment.

Step 3630 requests the storage device control unit 130 to relocate the data 410 of the file 141 in a storage device 140 having an identifier of the column 300 of the searched row, and proceeds to Step 3800 of FIG. 38.

Step 3700 of FIG. 37 determines the value of a power counter of the column 320 of the selected row.

In Step 3700, when the value of the column 320 of the selected row is greater than zero, control proceeds to Step 3710 because the power to the storage device 140 does not need to be turned on. When the value of the column 320 of the selected row is zero, control proceeds to Step 3720.

Step 3710 increments the value of the column 320 of the selected row, and returns to the caller.

Step 3720 requests the storage device control unit 130 to turn on power to a storage device 140 having an identifier of the column 300 of the selected row.

Step 3800 of FIG. 38 decrements the value of the column 320 of the selected row.

Step 3810 determines the value of a power counter of the column 320 of the selected row.

In Step 3810, when the value of the column 320 of the selected row is greater than zero, control returns to the caller when power to the storage device 140 does not need to be turned off. When the value of the column 320 of the selected row is zero, control proceeds to Step 3820.

Step 3820 requests the storage device control unit 130 to turn off power to a storage device 140 having an identifier of the column 300 of the selected row, and returns to the caller.

Figure 39:
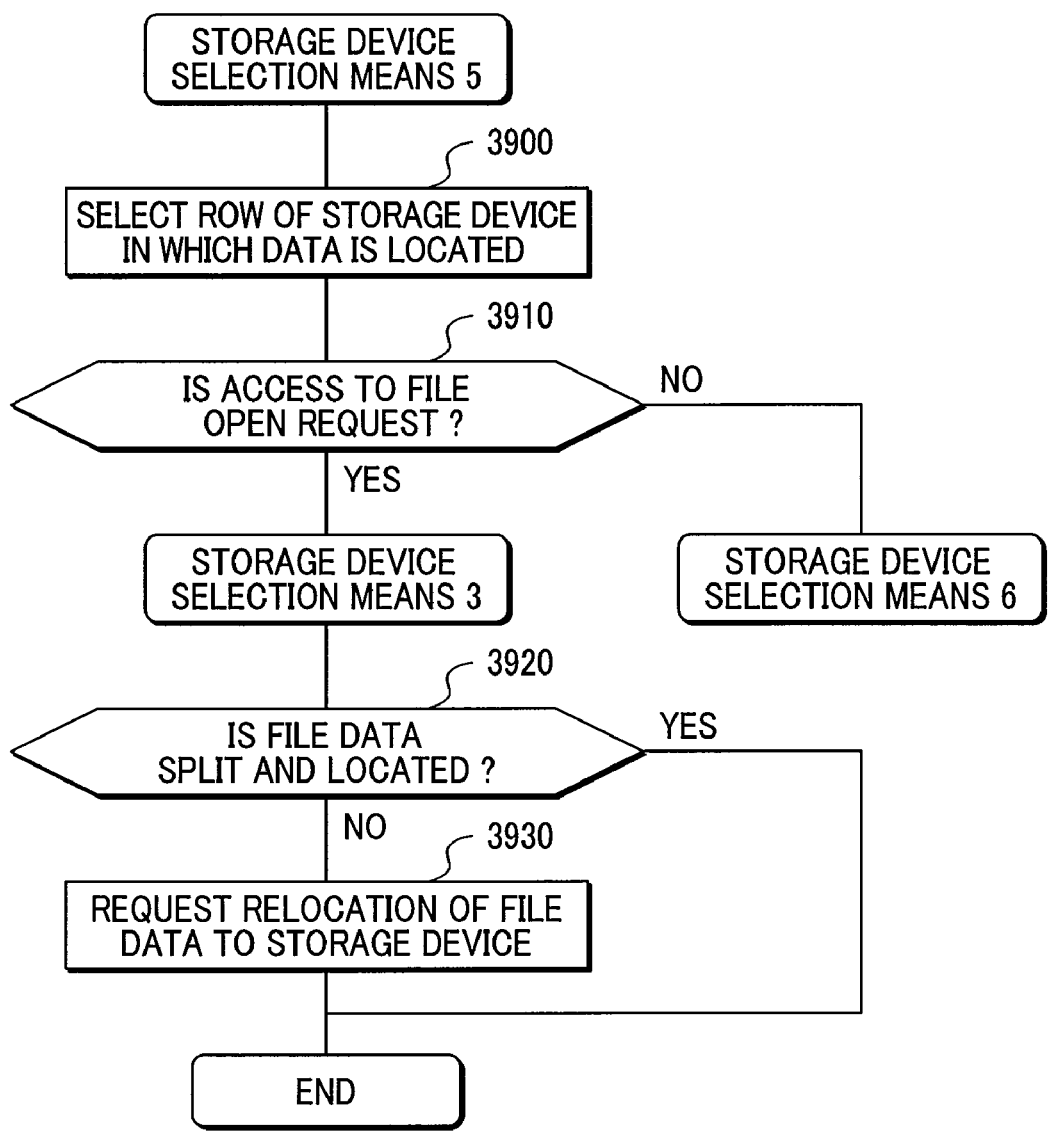
FIG. 39 is a flowchart showing processing of storage device selection means 5 in the fourth embodiment.

Step 3900 of FIG. 39 consults the storage device management table 127 to select a row of the column 300 in which an identifier of the column 3100 of the searched row is registered.

Step 3910 determines whether access to the file 141 is an open request.

In that case, control proceeds to Step 3700 of FIG. 37. Otherwise, control proceeds to Step 4000 of FIG. 40.

Step 3920 determines whether the data 410 is located in a storage device 140 having an identifier of the column 300 of the selected row.

In that case, the processing terminates. Otherwise, control proceeds to Step 3930.

Step 3930 requests the storage device control unit 130 to relocate the data 410 of the file 141 in a storage device 140 having an identifier of the column 300 of the selected row, and the processing terminates.

Figure 40:
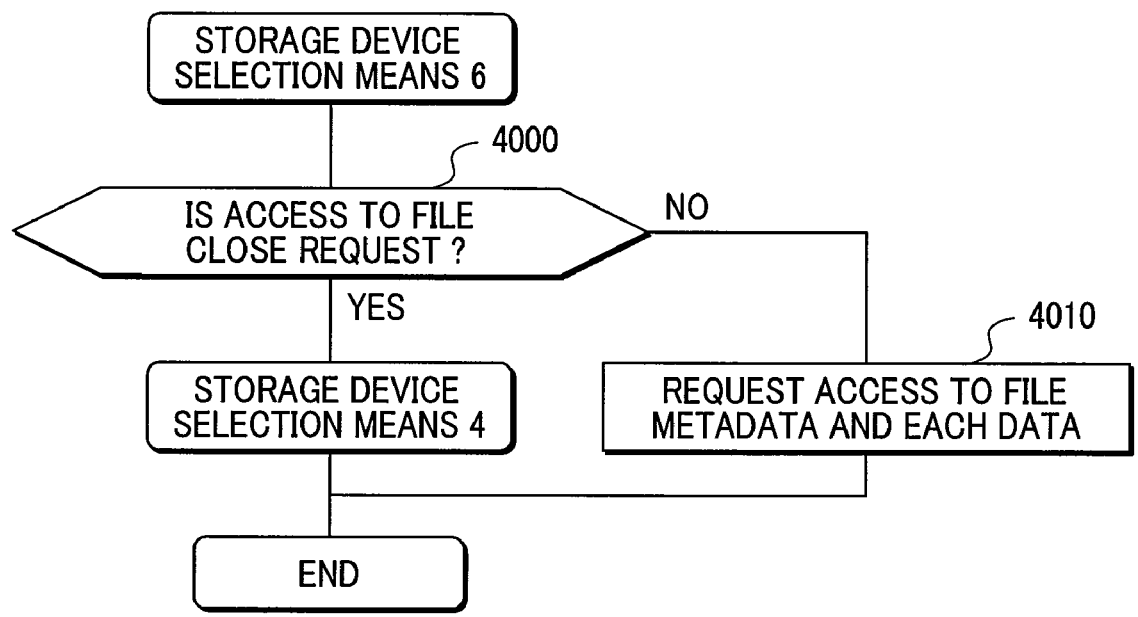
FIG. 40 is a flowchart showing processing of storage device selection means 6 in the fourth embodiment.

Step 4000 of FIG. 40 determines whether access to the file 141 is a close request.

In that case, control proceeds to Step 3800 of FIG. 38. Otherwise, control proceeds to Step 4010.

Step 4010 requests the storage device control unit 130 to distribute metadata 400 access and data 410 access of the file 141 to the storage device 140 according to an identifier of the column 300 of the searched row and an identifier of the column 300 of the selected row, and the processing terminates.

Figure 41:
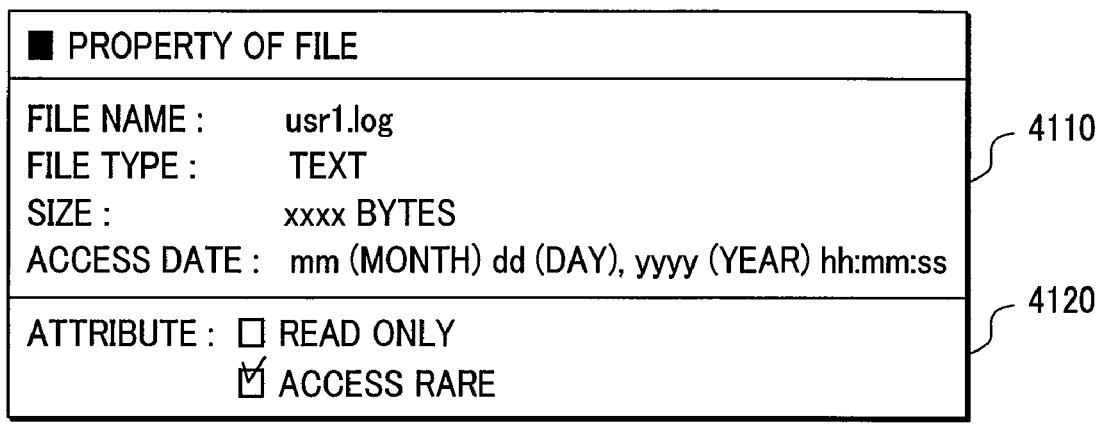
FIG. 41 is an explanatory drawing showing a file property window in the fourth embodiment.

FIG. 41 is an explanatory drawing showing a file property window 4100 in this embodiment.

The file property window 4100 has a field 4110 to display information of metadata 400 of the file 141 and a field 4120 to specify attributes of metadata 400 of the file 141.

By marking the attributes of the field 4120, the access rate attribute 3000 of the metadata 400 of the file 141 is specified, and by the storage device selection means 122, the metadata 400 and the data 410 of the file 141 are split and located in the storage device 140.

Figure 42:
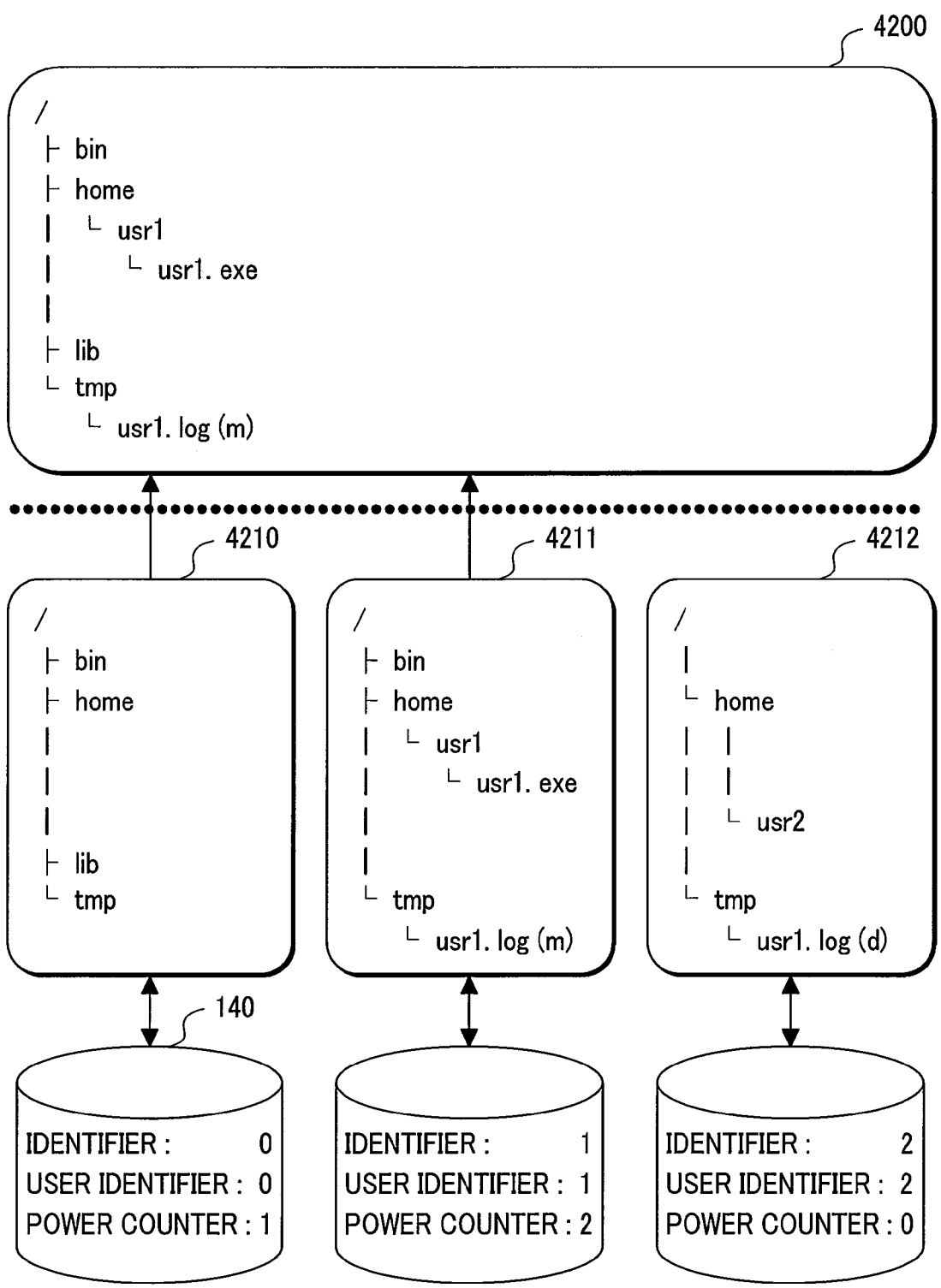
FIG. 42 is an explanatory drawing showing a directory structure view in the fourth embodiment.

FIG. 42 is an explanatory drawing showing a directory structure view in this embodiment.

The directory structure view 4200 is a directory structure viewable to users who use the computer system.

Directory structures 4210, 4211, and 4212 each show file locations in storage devices 140 allocated based on user's information. In this embodiment, a storage device 140 having the directory structure 4211 is also allocated as a storage device in which the data 410 of a rarely accessed file 141 of a storage device 140 having the directory structure 4210 is located. Likewise, a storage device 140 having the directory structure 4212 is also allocated as a storage device in which the data 410 of a rarely accessed file 141 of a storage device 140 having the directory structure 4211 is located.

The file system program 120 makes an overlap of the directory structures 4210 and 4211 of storage devices 140 the power to which is on appear as the directory structure view 4200 to users who use the computer. By the file system program 120, power to the storage device 140 having the directory structure 4212 is not turned on until an allocating user starts the use of the computer system, or a request to a rarely accessed file 141 in the storage device 140 having the directory structure 4211 occurs.

Therefore, according to this embodiment, in the file system program 120, by locating metadata 400 and data 410 of a file 141 specified with the access rare attribute 1600 in different storage devices by the storage device allocation means 121 and the storage device selection means 122, storages can be efficiently used while increasing the effect of reducing power consumption of the storages.

Although the present invention has bee described in detail based on various embodiments, it goes without saying that the present invention is not limited to the above-described embodiments, and may be modified in various ways without departing from its purport such as group identifiers are used as users' information instead of users' identifiers.

The present invention can apply to a method for managing storages by a file system in a computer system, particularly a method for managing storage power in a large-scale computer system.

What is claimed is:

1. A storage device management method for managing power provided to a plurality of storage devices of a computer system, the method comprising the steps of:
   allocating a storage area of a first storage device of the plurality of storage devices to a file which is used by a user of the computer system;
   registering user information of the user, the user information indicating a correspondence between the user and the first storage device in which the file is located;
   predicting whether access to the file has started or terminated, based on the user information and whether the user logs in to the computer system or logs out from the computer system;
   extracting, from the storage devices in the computer system, the first storage device in which the file is located, based on the user information;
   commanding that power to the first storage device be turned on, based on a result of the step of extracting, and a result of the step of predicting that access to the file has started; and
   commanding that power to the first storage device be turned off, based on a result of the step of extracting, and a result of the step of predicting that access to the file has terminated.

2. The storage device management method according to claim 1,
   wherein allocating the storage area of the first storage device to the file which is used by the user is based on the user information of the user registered in the computer system.

3. The storage device management method according to claim 2,
   wherein the computer system holds jobs of the user and schedules execution of the jobs, and when predicting that access to the file has started or terminated, commands that the power to the storage device be turned on or off, based on the user information of the job that starts or terminates execution.

4. The storage device management method according to claim 2,
   wherein the file includes metadata and data, the metadata has a distributed access attribute indicating distributed access to the data, and the plurality of storage devices are allocated based on the attribute indicating distributed access.

5. The storage device management method according to claim 4, further comprising:
   when commanding that the first storage device be turned on or off, commanding that power to the plurality of storage devices be turned on or off.

6. The storage device management method according to claim 5, further comprising:
   when extracting the first storage device, locating a file not specified with the attribute indicating distributed access in one storage device included in the plurality of storage devices, and splitting and locating a file specified with the attribute indicating distributed access in the plurality of storage devices.

7. The storage device management method according to claim 2,
   wherein the file includes metadata and data, the metadata has an access rare attribute indicating that access to the data is rare, and the storage devices are allocated based on the access rare attribute.

8. The storage device management method according to claim 7, further comprising the steps of:
   when commanding that power to the first storage device be turned, commanding turning on power to the first storage device, and not commanding that power to a second storage device be turned on; and
   when commanding that power to the first storage device be turned off, commanding that power to the first storage device be turned off, and not commanding that power to the second storage device be turned off.

9. The storage device management method according to claim 7, further comprising the steps of:
   when extracting the first storage device, extracting as the first storage device a storage device in which is located data of the file that is not specified with the access rare attribute and the metadata of the file that is specified with the access rare attribute; and
   extracting as the second storage device a storage device in which is located the data of the file that is specified with the access rare attribute, and turning on power to the second storage device as long as the file that is specified with the access rare attribute is opened.

10. A computer program product for managing, in a computer system including a computer and a plurality of storage devices, power provided to the plurality of storage devices, the computer program product comprising:
a storage device management program; and
a computer-readable storage medium having the storage device management program tangibly embodied thereon, wherein the storage device management program causes the computer to:
allocate a storage area of a first storage device of the plurality of storage devices to a file which is used by a user of the computer system;
register user information of the user, the user information indicating a correspondence between the user and the first storage device in which the file is located;
whether access to the file has started or terminated, based on the user information and whether the user logs in to the computer system or logs out from the computer system; and
extract, from the storage devices in the computer system, the first storage device in which the file is located, based on the user information;.

11. The computer program product according to claim 10, wherein allocation of the storage area of the first storage device to the file which is used by the user is based on the user information of the user registered in the computer system.

12. The computer program product according to claim 11, wherein the storage device management program further causes the computer to:
command that the power to the first storage device be turned on, based on a result of extracting the first storage device, and a result of predicting whether access to the file has started; and
command that the power to the first storage device be turned off, based on a result of extracting, and a result of predicting that access to the file has terminated,
wherein the user information of the first user who logs in to the computer system is transferred to a function for commanding that the power to the storage device be turned on, and
wherein the user information of the first user who logs out from the computer system is transferred to a function for commanding that the power to the storage device be turned off.

13. The computer program product according to claim 10, wherein the file includes metadata and data, and the metadata has a distributed access attribute indicating distributed access to the data, and
wherein the plurality of storage devices are allocated based on the attribute indicating distributed access.

14. A storage device management system for managing power provided to a plurality of storage devices of a computer system, the storage device management system comprising:
computer;
a storage device control unit; and
the plurality of storage devices,
wherein the computer the executes steps of:
allocating a storage area of a first storage device of the plurality of storage devices to a file which is used by a user of the computer system;
registering user information of the user, the user information indicating a correspondence between the user and the first storage device in which the file is located;
predicting whether access to the file has started or terminated, based on the user information and whether the user logs in to the computer system or logs out from the computer system;
extracting, from the storage devices in the computer system, the first storage device in which the file is located, based on the user information;
commanding the storage device control unit to turn on power to the first storage device, based on a result of the step of extracting, and a result of the step of predicting that access to the file has started; and
commanding the storage device control unit to turn off power to the first storage device, based on a result of the step of extracting, and a result of the step of predicting that access to the file has terminated.

15. The storage device management system according to claim 14,
wherein allocating, by the computer, the storage area of the first storage device to the file which is used by the user is based on the user information of the user who has registered in the computer system.

16. The storage device management system according to claim 15,
wherein the file includes metadata and data, and the metadata has an access rare attribute indicating that access to the data is rare, and
wherein the storage devices are allocated based on the access rare attribute.

17. The storage device management system according to claim 16,
wherein the computer, when commanding the storage device control unit to turn on power to the first storage device, commands that power to the first storage device be turned on, and does not command that power to a second storage device be turned on, and
wherein the computer, when commanding the storage device control unit to turn off power to the first storage device, commands that power to the first storage device be turned off, and does not command that power to the second storage device be turned off.

18. The storage device management system according to claim 17,
wherein the computer, when extracting the first storage device, extracts as the first storage device a storage device in which is located data of the file that is not specified with the access rare attribute and the metadata of the file that is specified with the access rare attribute, extracts as the second storage device a storage device in which is located the data of the file that is specified with the access rare attribute, and turns on power to the second storage device as long as the file that is specified with the access rare attribute is specified is opened.

* * * * *